US008248462B2

(12) United States Patent
Peterka et al.

(10) Patent No.: US 8,248,462 B2
(45) Date of Patent: *Aug. 21, 2012

(54) DYNAMIC PARALLAX BARRIER AUTOSTEROSCOPIC DISPLAY SYSTEM AND METHOD

(75) Inventors: Thomas Peterka, Hillside, IL (US); Daniel Sandin, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1458 days.

This patent is subject to a terminal disclaimer.

(21) Appl. No.: 11/787,435

(22) Filed: Apr. 16, 2007

(65) Prior Publication Data

US 2008/0143895 A1    Jun. 19, 2008

Related U.S. Application Data

(60) Provisional application No. 60/875,207, filed on Dec. 15, 2006.

(51) Int. Cl.
*H04N 13/04* (2006.01)
*G02F 1/1335* (2006.01)
*G09G 1/08* (2006.01)

(52) U.S. Cl. ............. 348/54; 348/55; 349/15; 345/19
(58) Field of Classification Search ............ 348/54, 348/55; 349/15; 345/19
See application file for complete search history.

(56) References Cited

U.S. PATENT DOCUMENTS

| | | | |
|---|---|---|---|
| 5,457,574 A * | 10/1995 | Eichenlaub | 359/619 |
| 5,973,678 A * | 10/1999 | Stewart et al. | 345/184 |
| 6,184,868 B1 * | 2/2001 | Shahoian et al. | 345/161 |
| 6,267,669 B1 | 7/2001 | Luciano, Jr. et al. | 463/7 |
| 6,611,243 B1 | 8/2003 | Moseley et al. | 345/4 |
| 6,666,766 B2 | 12/2003 | Baerlocher et al. | 463/16 |
| 6,717,728 B2 | 4/2004 | Putilin | 359/462 |
| 6,806,849 B2 | 10/2004 | Sullivan | 345/5 |
| 6,811,482 B2 | 11/2004 | Letovsky | 463/7 |
| 6,866,585 B2 | 3/2005 | Muir | 463/31 |
| 6,887,157 B2 | 5/2005 | LeMay et al. | 463/32 |
| 6,929,369 B2 | 8/2005 | Jones | 353/10 |
| 6,942,571 B1 | 9/2005 | McAllister et al. | 463/20 |
| 7,058,252 B2 | 6/2006 | Woodgate et al. | 385/16 |
| 7,112,133 B2 | 9/2006 | Lyons | 463/16 |
| 7,123,287 B2 | 10/2006 | Surman | 348/51 |
| 7,128,647 B2 | 10/2006 | Muir | 463/20 |
| 7,169,044 B2 | 1/2007 | Baerlocher et al. | 463/20 |
| 2002/0005864 A1 * | 1/2002 | Temkin et al. | 345/701 |
| 2002/0024675 A1 * | 2/2002 | Foxlin | 356/620 |
| 2002/0119815 A1 | 8/2002 | Lyons | 463/16 |
| 2003/0069066 A1 | 4/2003 | Seelig et al. | 463/20 |
| 2003/0085866 A1 * | 5/2003 | Bimber et al. | 345/156 |
| 2004/0002380 A1 | 1/2004 | Brosnan et al. | 463/32 |

(Continued)

FOREIGN PATENT DOCUMENTS

EP    1 463 007 A2    9/2004

(Continued)

*Primary Examiner* — Ranodhi Serrao

(57) ABSTRACT

Embodiments of the invention provide a dynamic parallax barrier autostereoscopic system and method for one and multiple users with user tracking. One example embodiment of the invention is a dynamic parallax barrier autostereoscopic virtual reality display system includes a display including a front display plane and a rear display plane. The front display plane dynamically generates barrier strips with transparent regions therebetween. The rear display plane generates images viewable through the transparent regions to create a virtual reality effect for a user or users.

17 Claims, 13 Drawing Sheets

U.S. PATENT DOCUMENTS

| | | | |
|---|---|---|---|
| 2004/0029636 A1 | 2/2004 | Wells | 463/32 |
| 2004/0053686 A1 | 3/2004 | Pacey et al. | 463/25 |
| 2004/0077401 A1 | 4/2004 | Schlottmann | 463/20 |
| 2004/0077402 A1 | 4/2004 | Schlottmann | 463/20 |
| 2004/0077404 A1 | 4/2004 | Schlottmann et al. | 463/30 |
| 2004/0102244 A1 | 5/2004 | Kryuchkov et al. | 463/32 |
| 2004/0102245 A1 | 5/2004 | Escalera et al. | 463/32 |
| 2004/0192430 A1 | 9/2004 | Burak et al. | 463/20 |
| 2004/0266536 A1 | 12/2004 | Mattice et al. | 463/43 |
| 2005/0037843 A1 | 2/2005 | Wells et al. | 463/30 |
| 2005/0059487 A1 | 3/2005 | Wilder et al. | 463/32 |
| 2005/0075167 A1 | 4/2005 | Beaulieu et al. | 463/32 |
| 2005/0215319 A1 | 9/2005 | Rigopulos et al. | 463/32 |
| 2005/0233799 A1 | 10/2005 | LeMay et al. | 463/20 |
| 2005/0255908 A1 | 11/2005 | Wells | 463/20 |
| 2005/0264560 A1 | 12/2005 | Hartkop et al. | 345/419 |
| 2006/0033992 A1 | 2/2006 | Solomon | 359/462 |
| 2006/0052152 A1 | 3/2006 | Tedsen et al. | 463/16 |
| 2006/0058100 A1 | 3/2006 | Pacey et al. | 463/31 |
| 2006/0068900 A1 | 3/2006 | Englman | 463/25 |
| 2006/0262395 A1 | 11/2006 | Ijzerman et al. | 359/462 |

FOREIGN PATENT DOCUMENTS

| | | |
|---|---|---|
| EP | 1 465 126 A2 | 10/2004 |
| WO | WO 2004/028650 | 4/2004 |
| WO | WO 2004/029893 | 4/2004 |
| WO | WO 2006/039257 | 4/2006 |
| WO | WO 2006/039348 | 4/2006 |
| WO | WO 2006/039371 | 4/2006 |

* cited by examiner

DYNAMIC PARALLAX BARRIER AUTOSTEREOSCOPIC DISPLAY SYSTEM AND METHOD

CROSS REFERENCE

The present application claims priority under 35 U.S.C. §119 from U.S. provisional application No. 60/875,207, which was filed on Dec. 15, 2006.

STATEMENT OF GOVERNMENT INTEREST

The present invention was made with government assistance under National Science Foundation Grant No. CNS0420477. The government has certain rights in the present invention.

FIELD OF THE INVENTION

A field of the invention is parallax barrier display. Another field of the invention is virtual reality display. Example applications of the invention include gaming, training, testing and advertising.

BACKGROUND OF THE INVENTION

Virtual reality systems have become common in research labs and high technology research applications. However, this technology has yet to achieve widespread commercial use. Many if not most virtual reality systems employ specialized peripherals and display systems, like helmets, goggles, and other heads-up displays to achieve a sense of the virtual environment. Yet, there are limitations to this type of technology. Autostereoscopic (AS) technologies provide three dimensional imagery without the need for goggles or other viewing aids.

Advances in virtual reality systems, including AS technologies, may provide for greater commercial acceptance. For example, lenticular screens and parallax barrier strip displays are dominant and popular AS technologies. Lenticular and barrier strip AS systems are known, with commercial products presently available. An example of a known AS system is the "Varrier" system introduced in 2004 by the Electronic Visualization Laboratory (EVL) at the University of Illinois at Chicago (UIC).

The function of a parallax barrier is to occlude certain regions of an image from each of the two eyes, while permitting other regions to be visible, as generally illustrated by FIG. 1. A first screen 2 includes a plurality of transparent strips 4 interspersed with a plurality of opaque strips 6 to selectively transmit/occlude corresponding image planes 8 from a second screen 10 to each of a right and left eye 12 and 14. By simultaneously rendering strips of a left eye image into the regions visible by the left eye and likewise for the right eye, a complete perspective view is directed into each eye. A user perceives a 3D representation, and an AS experience results without the need for 3D glasses. When the barrier strip concept is coupled with real-time viewupdate, head-tracking, first-person perspective, and interactive application control, an AS VR system results. Such systems can be presented on a large scale (e.g., a grid of multiple tiled screens, a smaller scale (e.g., a desktop), or any other scale.

A known parallax barrier is a high-resolution printed film that is affixed to a glass substrate and appended to the front of an LCD monitor. Another known variation is a lenticular screen which functions equivalently. The printed pattern on the barrier is a fine-pitch sequence of opaque and transparent strips, with the period of the repeating pattern on the order of 0.5 to 1 mm.

The period of this barrier is determined a priori by the system designer and determines key outputs in system response that cannot be varied once built. Output parameters such as view distance operating range (minimum, maximum, optimum), visual acuity, and the fact that the system is capable of only supporting one user at a time are three such results of barrier period choice. The consequences of these design-time decisions are magnified by the long turn-around time to correct or modify the barrier.

Moreover, with respect to supporting two tracked users, there is no single optimal barrier period that can be pre-selected since the barrier period causes inter-channel conflicts between users. In addition to fixed working range and strict single user mode for tracked two-view systems, static barrier AS systems have some other disadvantages. One is that the barrier cannot be disabled—it is essentially "locked" in 3D mode and not able to provide 2D imaging. Another problem relates to horizontal resolution loss. One barrier period consists of a duty cycle of approximately ¾ black to ¼ clear. Hence, each eye channel contains only ¼ of the horizontal screen resolution.

The spatial inefficiency of parallax barrier AS is a direct result of the Nyquist Sampling Theorem, which dictates that eye channels are separated by equivalent amounts of unused screen space, termed "guard bands." Also, head-tracked static barrier AS is further limited by the fact that performance criteria such as frame rate and latency are more critical in fixed barrier AS than in other stereo techniques. Unlike passive and active stereo VR, moving the head faster than the system response time results not only in scene lag but also in visible artifacts because incorrect data is steered to the eyes. Since channels are continuously steered to the user's eyes in head-tracked AS, one may readily out-run the system and move the head faster than channels can be updated. Defects such as image flicker, black banding, and ghosting are visible in a head-tracked AS VR system during head movements, and disappear when the user stops moving.

SUMMARY OF THE INVENTION

Embodiments of the invention provide a dynamic parallax barrier autostereoscopic virtual display system and method.

One example embodiment of the invention is a dynamic parallax barrier autostereoscopic display system comprising a display including a front display plane and a rear display plane. The front display plane dynamically generates barrier strips with transparent regions therebetween. The rear display plane generates images viewable through the transparent regions for a user or users.

Example systems include a tracking system for tracking the position of at least a first user and a second user. A controller provides data to the display for displaying the parallax barriers and said images wherein each of the first and second users view different imagery. The controller also communicates with the tracking system and dynamically controls the display in response to movement of one or more of the first and second users. Systems of the invention, including the example system described above, may be particularly useful in gaming and wagering applications.

An additional example system of the invention is an autostereoscopic parallax virtual reality system comprising a liquid crystal display that generates dynamic barrier strips on a front plane with transparent regions between the strips, and generates images in a rear plane underlying said front plane and arranged to be viewed through the transparent regions. The display is configured to operate the front plane and rear plane both synchronously and asynchronously. The barrier strips define a barrier period. A tracking system is provided for tracking the position of at least a first user. A controller communicates with the display causes it to display three dimensional images. The controller also communicates with the tracking system and is further configured to optimize the barrier period in relation to the distance the at least a first user is from the display.

Still another example system of the invention is an autostereoscopic parallax gaming system comprising a liquid crystal display configured for providing dynamic barrier strips on a front plane with transparent regions therebetween, and configured for providing imagery in a rear plane underlying the front plane and arranged to be viewed through the transparent regions. The display is configured to operate the front plane and rear plane both synchronously and asynchronously. The barrier strips define a barrier period. The system further includes a tracking system for tracking at least the distance of at least a first user from the display. A controller is provided and communicates with the tracking system and the display causes the display to display three dimensional images. The controller is configured to control the outcome of a gaming application and to cause said display to display the barrier strips on a continuous and floating point basis wherein the barrier period is continuously adjustable and variable.

DETAILED DESCRIPTION

Embodiments of the invention provide a dynamic parallax barrier autostereoscopic virtual display systems and methods for one and multiple users with user tracking. One example embodiment of the invention is a dynamic parallax barrier autostereoscopic virtual reality display system that includes a display including a front display plane and a rear display plane. The front display plane dynamically generates barrier strips with transparent regions therebetween. The rear display plane generates images viewable through the transparent regions to create a virtual reality effect for a user or users.

In one example embodiment of the invention, a barrier strip AS virtual reality display system is provided using a solid-state dynamic parallax barrier. The example system includes at least one display device and at least one controller. The controller can be, for example, one or more processor based devices (such as a computer) executing code useful to cause it to control various aspects and operations of the system. For example, a controller can include a dynamic image tuning, tracking, and a logic subsystem that includes a master controller, a first rendering slave, and a second rendering slave.

A dynamic parallax barrier has been discovered to mitigate restrictions inherent in static barrier systems such as fixed view distance range, slow response to head movements, and fixed stereo operating mode. By dynamically varying barrier parameters in real time, users can move closer to the display and move faster laterally than with a static barrier system. Furthermore, users can switch between 3D and 2D modes by disabling the barrier. One example system described herein is head-tracked, directing view channels to positions in space reported by a tracking system in real time. By varying the barrier period to eliminate conflicts between multiple users, this example system presents four independent eye channels when two users are present.

Each user receives an independent pair of left and right eye perspective views based on their position in 3D space. The example display device is constructed using a dual-stacked LCD monitor where a dynamic barrier is rendered on the front display and the rear display produces a modulated virtual reality scene composed of two or four channels. In one embodiment, a small-scale virtual reality system is particularly useful, for example, for gaming, entertainment, training, research and other applications.

Example dynamic barrier systems address many shortcomings of typical static parallax barrier virtual reality display systems, by providing for an expanded view distance working range, reduced sensitivity to system latency during head movement, eliminated physical barrier registration, the ability to disable the barrier and convert the display to 2D, and the affordance of two independently tracked users, each with their own AS perspective of the virtual world.

Figure 2:
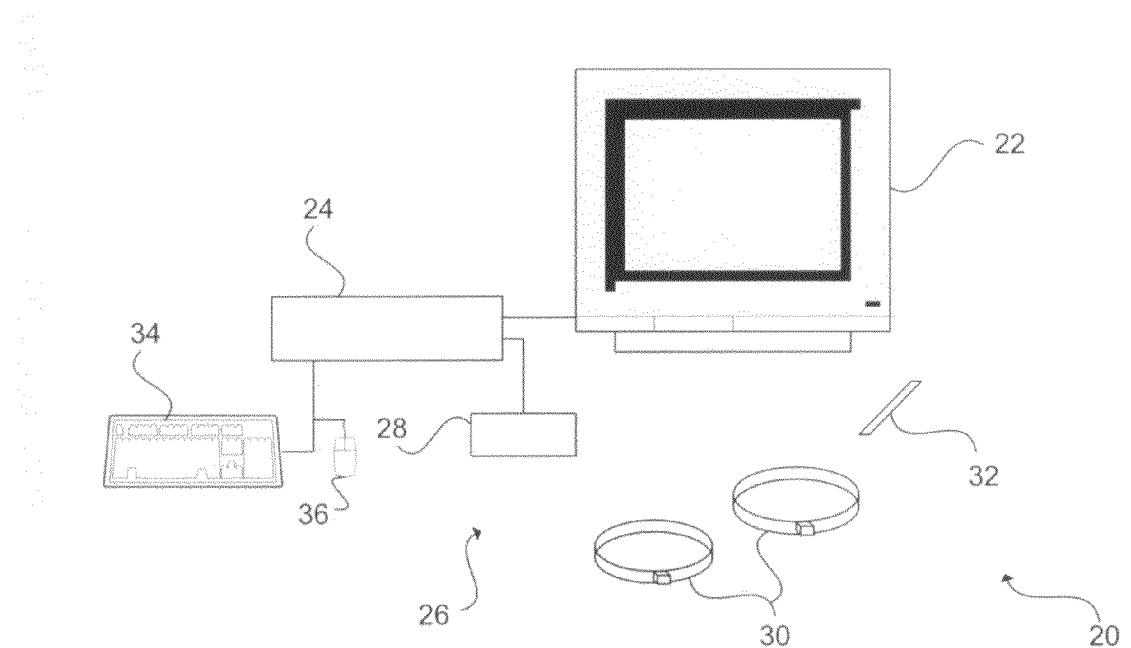
FIG. 2 is a schematic illustration of an example system of the invention.

FIG. 2 schematically illustrates one example system 20 of the invention. It includes a display element 22 linked to a controller 24. A tracking system collectively shown at 26 includes a detector 28 and two sensors 30 for wearing by a user (as a headband, for example). The detector 28 can determine the location and orientation of the sensors 30 and feed this information to the controller 24 so that it can alter the imagery shown on the display 22 to correspond to the user position and orientation. This can be done in real time. The tracking system can be wired or wireless, and can use light, electromagnetic, or other technologies between the detector 28 and sensors 30.

One or more tools 32 can also be provided and be linked to the controller 24 and tracked by the tracking system 26. The tool 32 can be any of a number of particular tools depending on the application at hand. It can be, for example, a haptic tool that provides force feedback to a user. It can also be a, for example, a joystick, a steering wheel, a mouse, a foot pedal(s), or other device for interacting with imagery displayed on the display 22. The tracking system 26 can dynamically detect the position and orientation of the tool 32 and communicate this information to the controller 24 so that it can dynamically render an image of the tool 32 on the display 24 in real time. Or, in other systems and applications, the tool 32 can be connected to the controller 24 so that a user can interact with the imagery displayed on the display 24.

The tool 32 can be, for example, a joystick or steering wheel that a user uses to "steer" or drive a vehicle through a virtual course displayed on the display 22 (with an example being, "flying" a virtual plane through a flying course). The controller 24 can or can not render an image of the tool 32 in such an application. Systems of the invention can also include data input devices such as a keyboard 34 and mouse 36 linked to the controller 24. These devices are useful for operating the system and/or for interacting with imagery being presented on the display 22. Other suitable data input devices are also contemplated, with examples including joysticks, remote control devices, keypads, and the like.

The display 22 can be of a size and scale as is desirable for a particular application. Larger sizes can offer more immersive and realistic imagery in some applications, and can be useful to better accommodate multiple users. In some applications, a single desktop scale display (e.g., 12 in., 15 in., or 19 in.) can be suitable. Also, although only one display 22 has been illustrated, some systems can include multiple displays 22 in a side-by-side tiled configuration with the controller 24 causes a single continuous image to appear over the multiple tiled displays 22. Also, one or more displays 22 can be arranged at angles to one another to provide a panoramic view. Displays 22 can be provided, for example, on a user's right side, center, left side, and overhead. Or, multiple displays 22 can be arranged in a cylindrical configuration to around a user (can be arranged, for example, to provide 180° or 360° imagery about a user).

Imagery can be provided in any desired form, including in 2D or 3D. Examples include a movie, a single image, engineering plans, maps, medical imagery, gaming imagery, wagering imagery, and virtually any other 2D or 3D imagery.

Various aspects of preferred embodiment systems of the invention will be discussed in greater detail herein below.

Dynamic Parallax Barrier Construction

Figure 3:
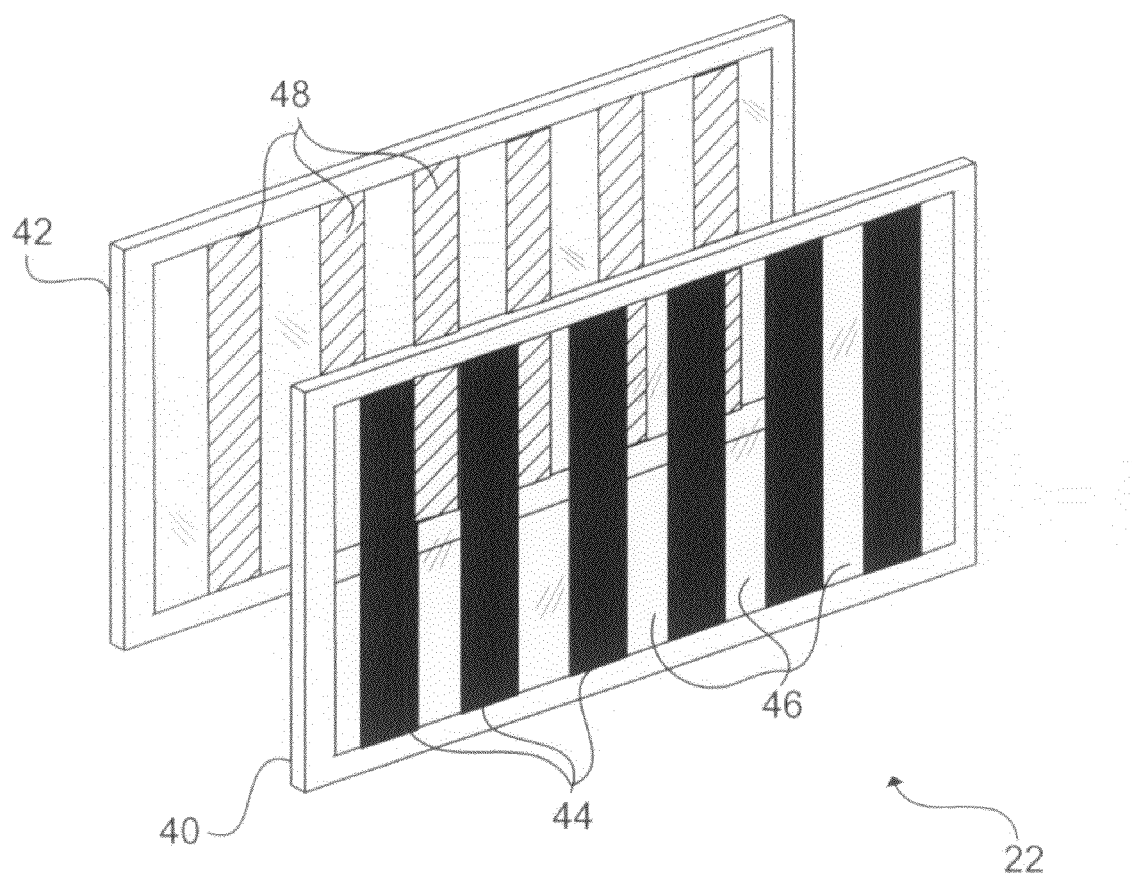
FIG. 3 is an exploded schematic illustration of an example display of the invention.

FIG. 3 schematically illustrates the display element 22 in an exploded view. A suitable dual-stacked LCD display can be constructed by placing a first display plane or screen 40 which can be, for example, a liquid crystal (LC) layer in a stacked configuration adjacent to and in front of an existing second display plane or screen 42 which can also be an LCD display, such that both layers 40 and 42 are illuminated by a single backlight (which can be present in underlying display 42), and the front layer angle of polarization is orthogonal to the rear. Display technology in addition to LCD can also be used. The final output intensity is the product of the two individual layer intensities:

$$I_{final} = I_{rear} * I_{front} \quad (1)$$

Dynamic barrier strips 44 are generated on the front (i.e., first) display 40 with transparent regions 46 therebetween. A plurality of individual image strips 48 are generated on the rear display 42 and are positioned to be viewed through the transparent regions 46. The image strips 48 are provided in left and right eye channels to cause a user to perceive a three dimensional image. Note that the barrier strips 44 and image strips 48 are illustrated schematically and not necessarily drawn to scale. In this manner 3D imagery can be perceived by a user.

Controller Structure

Controllers of the invention such as the controller 24 can be any of a number of suitable devices, software or firmware. One or more processor based devices such as computers are suitable examples. Also, the one or more computers of the controller can be linked to one another, and can include program instructions stored on a memory useful to cause the one or more computers to carry out steps of operating a system of the invention. Further, it will be appreciated that the term "controller" as used in this context herein is intended to be broadly interpreted, and can include multiple individual processor based devices (such as multiple computers) that are interoperating to provide control of the system. Also, although the controller 24 has been illustrated as a stand alone element in FIG. 2, it will be appreciated that controllers of the invention can be included with or integral with other elements of the invention. It can be integral with the display 22 or tracking system 26, for example, or with other components of the system. Because the controller 24 can functionally be a processor, it can be convenient and provide a more compact overall system when it is provided integral with a display 22, tracking system 26, or other component.

In one example system of the invention, the controller 24 is structured as a small cluster of three processes: a master controller, the front screen rendering slave, and the rear screen rendering slave. Inter-process communication is accomplished using any suitable program code, including commercially and freely available codes such as MPICH 2.0. In one example system each process resides on a separate Linux machine with dual Intel Xeon CPUs, an NVIDIA Quadro FX3000 GPU graphics card, and gigabit Ethernet. In some applications, the display 22 is a stacked configuration that includes front and rear screens 40 and 42 as shown in FIG. 3. In some applications these two screens cannot be driven from the same graphics card because some applications utilize asynchronous update of the two screens (as described below). The front screen 40 is lightly loaded compared to the rear 42, since the front needs to only render the barrier strips 44 while the rear screen 42 renders the modulated scene. It has been discovered that operating these two screens asynchronously in a rapid steering mode offers advantages and benefits as discussed below.

Tracking System

The tracking system 26 of FIG. 2 can be any suitable tracking system for measuring motion of a user. It includes a detector 28 and sensors 30 that can be worn on a user's head. The detector 28 determines the position of the sensors 30 in space, and can also detect orientation of the sensors 30. In this manner the position and orientation of users can be dynamically tracked. As used herein, the term "dynamic" is intended to be broadly interpreted as meaning in substantially real time. The tracking system 26 communicates data to the controller 24, and can be operated by the controller 24. Other components can be provided. Tracking can be provided for any suitable number of users, with examples including one, two, three, four or more. Also, tracking of other portions of a user can be provided in addition to or as an alternative to head tracking, with one example being hand tracking.

Figure 4:
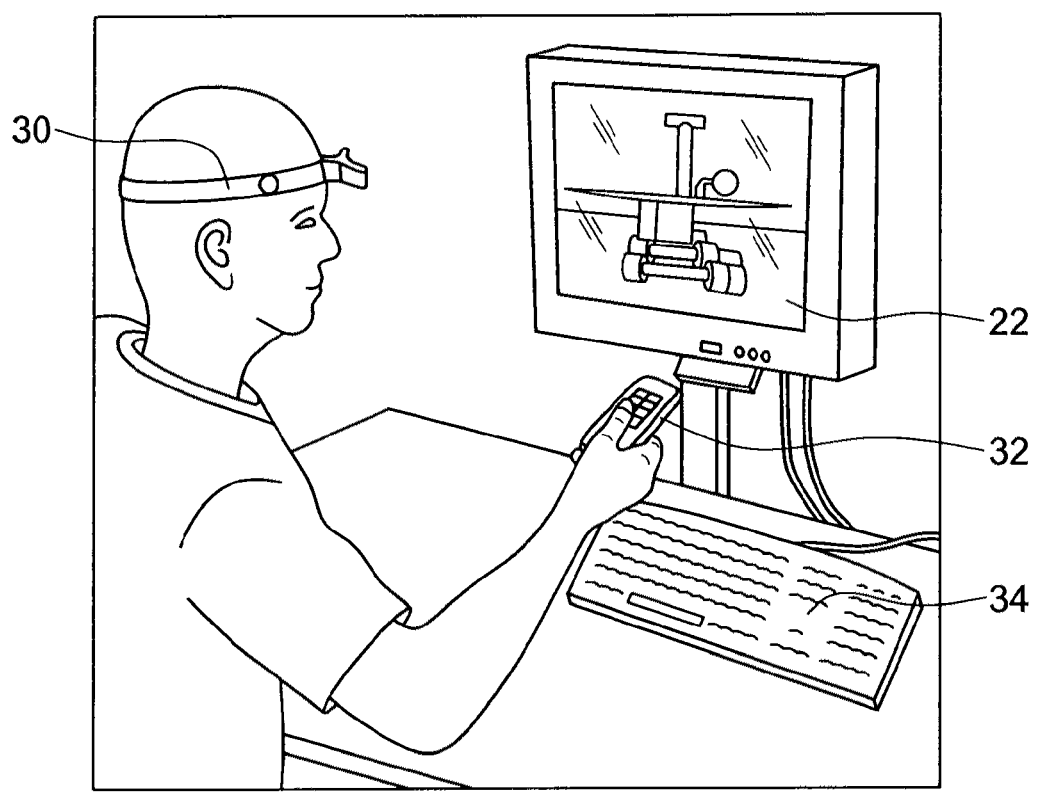
FIG. 4 illustrates a user using an example system of the invention.

By way of further description, in one example system head tracking of a user is accomplished using an Intersense 900 Precision Motion Tracker tracking system available from INTERSENSE Corp., Bedford, Mass.; with two sensors for two users. Each user wears one sensor 30 on a headband on the forehead. Other implementations utilize tether-less camera tracking. FIG. 4 depicts one user wearing a tracking sensor headband 30, interactively navigating through a VR scene on display element 22.

An independent first person perspective is channeled to each of two or more users. Real-time interactivity is afforded with either a tracked or untracked wand such as the tool 32, which can include a joystick, multiple buttons, and other data input devices. In the case of multiple users, the tool 32 can be shared or controlled by only one user at a time, or multiple tools 32 can be provided. Real-time tracking can be performed on multiple tools, one each used by one each of the multiple users.

Image Computation

The controller 24 can include one or more processors, program code stored on one or more memories, video cards, video controllers, and the like. The controller 24 can control one or more of the display element 22, the tracking system 26, the tool 32, and/or other elements of the system. The controller can be operated through use of the keyboard 34 and/or mouse 36.

In one example system, the controller includes program code useful to control the display element 22 and to cause the desired imagery to be displayed thereon. The program code controls the front barrier strips 44 (FIG. 3) and modulates the rear screen channels 38. Modulation can include taking two, four or more perspective views and interleaving alternating strips of each into a single image. In order to modulate the rear screen 42 scene, and to render the front visible barrier strips 44, a constantly variable floating point step function is constructed of the desired period and duty cycle. This function determines whether a subpixel fragment is masked as white or black. In the case of the rear screen 42, this mask is multiplied by the rear scene content, while in the front screen 40, this mask is the front barrier intensity. The controller 24 is configured to practice modulation such that a constant quality level of 1.0 is provided and as many eye channels as are required (to accommodate 1, 2, 3 or more users) are supported, permitting multiple users to simultaneously modulate a total of two eye channels per user (e.g., four channels for two users).

Instead of utilizing a discrete image-based barrier that is sub-pixel registered with the underlying sub-structure of the display device, the barrier computational model practiced by controllers of the present invention is continuous and floating-point based. That is, the computational model used to represent the barrier within the one example controller of the invention is represented by a number of continuously variable parameters defined within the domain of real, or floating point continuous values, as opposed to discreet integer values. This is by design, and there are several advantages to this approach. For example, not only is the barrier period continuously adjustable, but so is the line tilt angle, so barrier parameters are infinitely variable to dynamically optimize viewing conditions. Moreover, when the barrier is scaled by perspective projection from the front 40 to the rear screen 42 (FIG. 3), quantization errors do not result from the multiple discretization that would occur if the barrier originated as an image-based (discrete) model. Rather, a scaled continuous barrier model is used to modulate the rear screen 42, and is discretized only once at the end of the process when converted to visible pixels by the graphics card.

Figure 5:
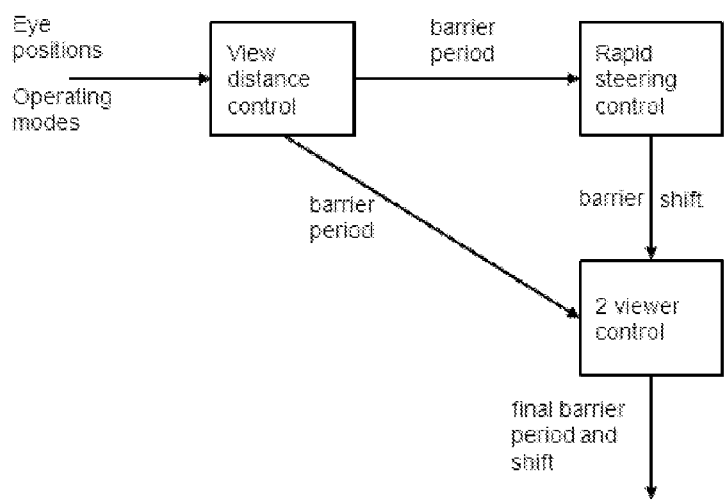
FIG. 5 is a diagram useful to illustrate some aspects of a system of the invention.

In order to further describe some of the functionality of controllers of the invention, reference is made to the schematic block diagram of FIG. 5. Various aspects of this block diagram are described in detail herein below.

View Distance Control

Figure 1:
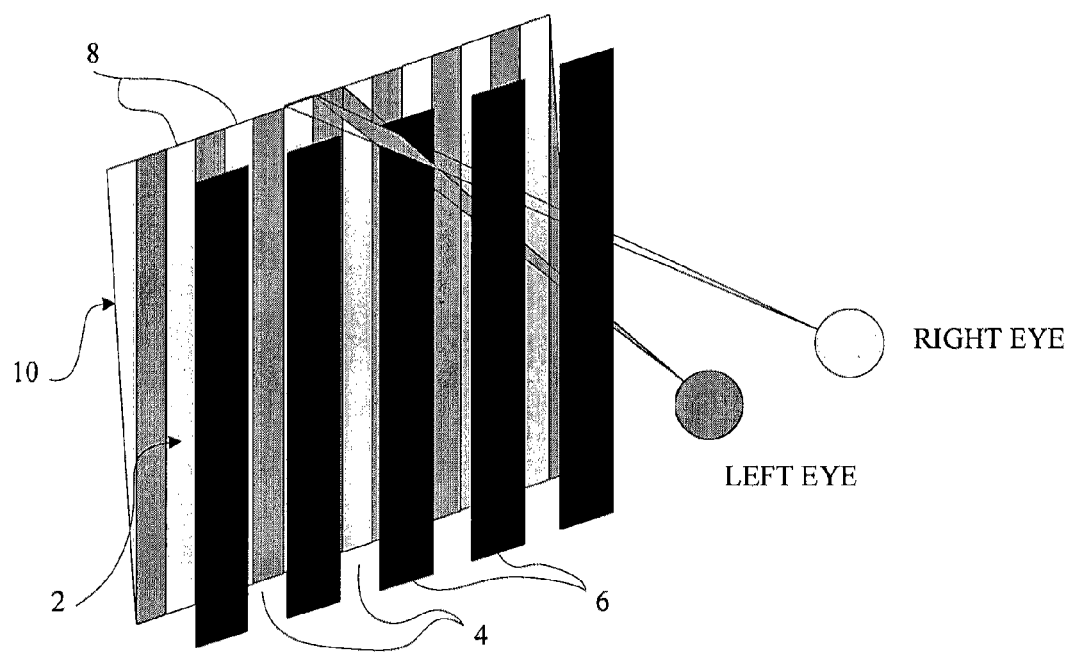
FIG. 1 is a schematic useful to illustrate a prior art device.

The example controller 24 is causes the display element 22 (FIGS. 1, 4) to dynamically change the displayed image strips 38 and barrier strips 44 in response to movement of the user(s) as detected by the tracking system 24. The controller 24 can also alter the image to maintain an optimal viewing distance for the user(s) as the user(s) move about. Importantly, the controller 24 does this dynamically—in close enough to real time so that a user sees changes to the imagery in real time and does not discern any delay between his movements and changes in the imagery.

At the optimal viewing distance from the display element in a static barrier system of the prior art, eye channel data and guard bands are spaced equidistantly within the rear screen modulated image. This optimal view distance is a function of the barrier period. In some systems of the invention, the controller's view distance control module sets the barrier period such that this condition is satisfied according to equation 2:

$$p/t=(2e-p)/(d+1) \tag{2}$$

where:
p=barrier period
t=optical thickness between front and rear screens
e=interocular distance
d=normal distance from eyes to front screen plane By continuously maintaining an optimal barrier period for the current user distance from the screen, example systems of the invention not only maintain the best possible image quality but also permit the user(s) to be closer to the screen than would otherwise be permitted by the minim view distance for a typical fixed parallax barrier system.

Rapid Steering Control

Some controllers of the invention are further provide rapid steering control. "Steering control" is intended to be broadly interpreted as referring to the controller altering the image (i.e., "steering") in response to user movement. In a typical traditional fixed barrier AS, it is easy to produce head movements fast enough to outrun the system response, resulting in momentary incorrect steering of channels to the eyes. When this occurs, the user sees black banding because the eyes pass into the guard band regions before the scene can be updated. Rapid steering in example systems of the present invention is to weaken the dependence of stereo quality on system latency, ideally affecting only perspective correctness as in the case of passive stereo.

In some systems of the present invention, the front screen 40 (FIG. 3) has a constant computational complexity and is relatively lightly loaded, maintaining a frame rate of about 50 Hz for example. This is compared to the rear screen 42 whose complexity depends on the VR scene complexity and can be maintained at a slower frame rate than the front screen 34, and that can be, for example, half or less than the frame rate of the front screen 40. The rear screen 42, for example, can drop to a slower 15 Hz or less for complex scenes (e.g., on the order of 100K vertices). The reasons for this disparity between front and rear loading are not technical limitations of systems of the invention; rather, they are a reflection of VR usage in general. Scene complexity grows as data set sizes increase, and frame rate is often sacrificed for higher image quality. It has been discovered that there are advantages to impacting these performance pressures only, or at least primarily, on the rear screen 42.

Furthermore, it has been discovered that this disproportionate load can be exploited to make a rapid steering mode possible, where rapid user head movements are accommodated by shifting the rendered front barrier strips 44 (FIG. 3) rather than waiting to re-render the rear image (e.g., strips 38). The rear screen 42 continues its computation, but the controller 24 decouples front 40 and rear screens 42 to allow both to proceed asynchronously at their fastest rates possible. The controller's 24 rapid steering control module monitors this behavior and sets the barrier shift according to equation 3:

$$s = e_x * t/(1+d) \quad (3)$$

where:
s=barrier shift amount
$e_x$=horizontal head movement distance
t=optical thickness between front and rear screens
d=normal distance from eyes to front screen plane Controllers of the invention can switch between a standard (i.e., synchronous) and rapid steering mode (i.e., asynchronous) in response to rapid movement of a user or other condition.

Multiple User Parallax Barrier Control

The above explanation of some functionality of the example controller 24 has focused on features (view distance control, 2D/3D capabilities, rapid steering, others) that are useful when one or more users are present. Although some systems of the invention are suitable for use with a single user, other systems support two or more tracked users, each receiving an independent pair of perspective eye channels. The below discussion turns to how the controller 24 sets the barrier period in multi-user mode. (It is noted, however, that the above discussed features (view distance control and rapid steering) as well as several discussed below, can likewise be useful when only one user is present.)

When two or more users are present, the barrier period must increase for at least two reasons. First, the period must expand by at least a factor of two to produce room for the additional channels to be multiplexed into the final image. Beyond this mandatory expansion, the period may need to grow further to avoid a conflict between each actual eye and the virtual repeating lobes from the other eyes.

Figure 6:
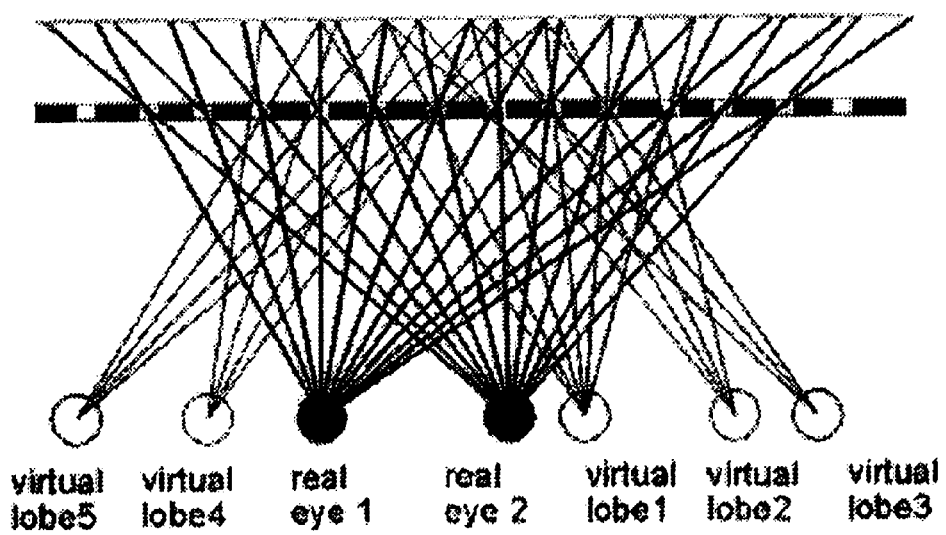
FIG. 6 is a diagram useful to illustrate some aspects of a system of the invention.

To understand this concept, one should appreciate that a parallax barrier display does not only direct optical channels to the two eye positions, rather those channels are repeated at multiple recurring locations across space as illustrated by FIG. 6. Here, the term "virtual lobe" is used to distinguish the primary eye channel location from all of its repetitions in space. The period of repetition is given in equation 4.

$$s = p*(d+1)/t \quad (4)$$

where:
s=lobe spacing
p=barrier period
d=normal distance from eyes to front screen plane
d=optical thickness between front and rear screens The function of the two user control module is to set the barrier period such that this period is the minimum that produces no conflicts between actual eyes and virtual lobes. A quantity referred to as "conflict energy" is defined by equation 5 for each eye, and total conflict energy for the system is defined by equation 6.

$$E_{i,j} = \begin{cases} |e - d_{i,j}|; \text{ for } d_{i,j} < e \\ 0; \text{ for } d_{ij} >= e \end{cases} \quad (5)$$

where:
$E_{i,j}$=conflict energy of eye I with respect to eye j
$d_{i,j}$=distance from eye I nearest virtual lobe from eye j
e=interocular distance $$E_{total} = \sum_i \sum_j E_{i,j} \quad (6)$$

Equations 5, 6 and a minimization algorithm can be summarized as follows. A conflict between an eye and a virtual lobe of another eye occurs when the distance between them is less than the interocular distance. When a conflict exists, the energy of that conflict is defined as the unsigned difference between the interocular distance and the conflicting distance. The total conflict energy is the sum of all possible conflict energies.

Because the total energy function contains many local minima, a linear search is required to compute the smallest barrier period where the total conflict energy becomes 0 (or close thereto). Those knowledgeable in the art will appreciate that many other search and optimization routines can be used. To optimize the search, in some systems of the invention parameters such as minimum, maximum, and step are tuned such that a small number of iterations (<50) are performed for each frame. Other systems of the invention, however, can more or less detailed optimizations (i.e., fewer ore greater number of iterations).

Synchronous/Asynchronous Modes

In order for the view distance, rapid steering, and 2-user modules to produce their intended results, some systems of the present can rely on both synchronous and asynchronous communication and display modes. For example, when in rapid steering mode, communication needs to occur asynchronously so that the front and rear screens 40 and 42 (FIG. 3) update at their own maximum possible rates. However, rapid steering can be disabled with two users present and/or disabled momentarily when the barrier period is modified by the view distance module. The front and rear screens 40 and 42 can be synchronized under these circumstances so that barrier period changes occur as seamlessly as possible.

Figure 7:
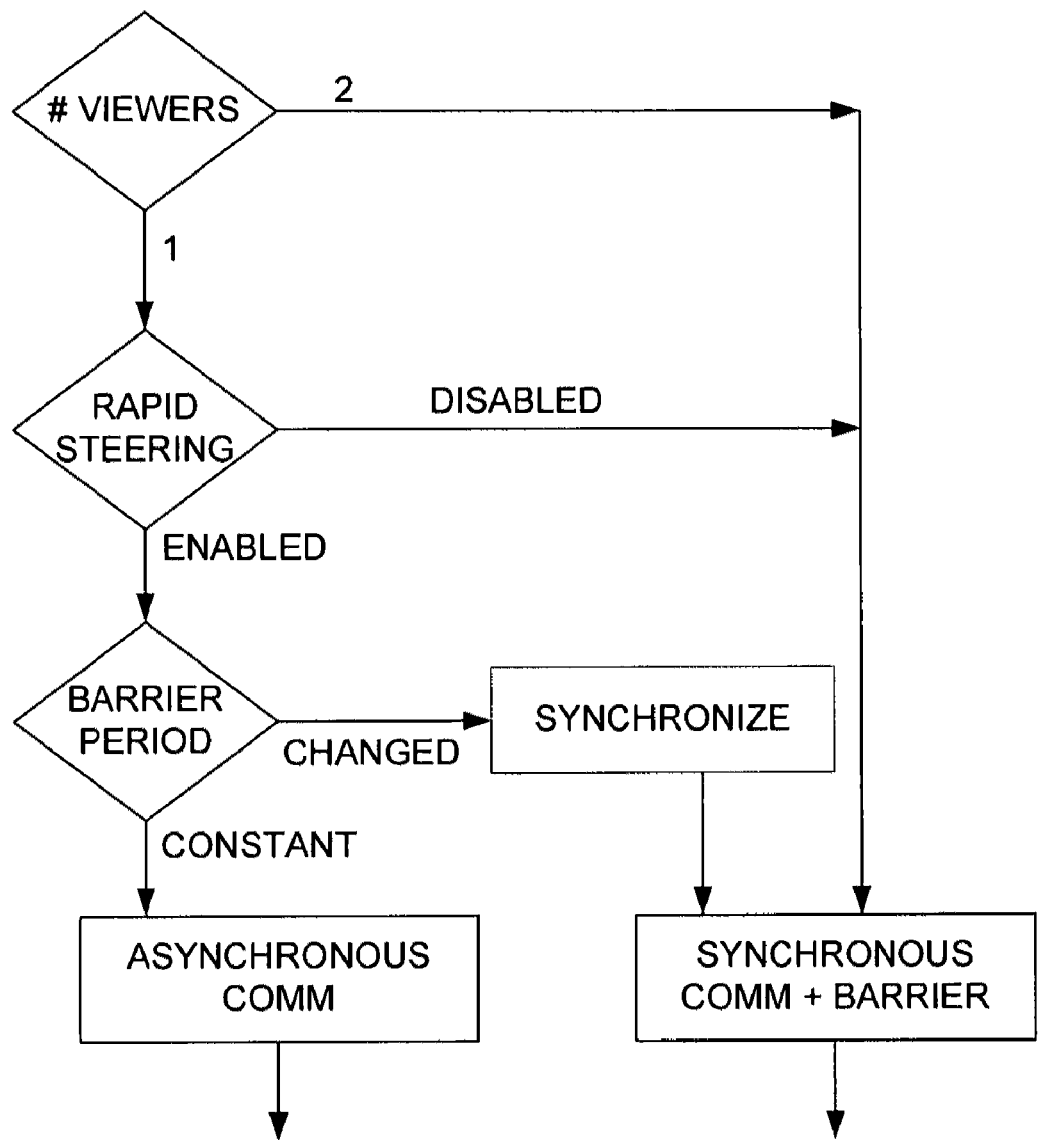
FIG. 7 is a block diagram useful to illustrate operation of an example system of the invention.

When the controller 24 determines that a barrier period change is required, the slave processes rendezvous; the change is made using synchronous communication, and then the processes continue as they were. When the controller switches to synchronous mode, an MPICH communication barrier can also be employed as a secondary method of synchronizing the two slaves with each other. FIG. 7 is a flowchart summarizing these two communication modes.

Communication in some systems of the invention follow a duplex handshaking protocol: slaves send ready messages to the master and the master responds by sending current data to the slaves. This flow control protocol permits slaves to run asynchronously when desired and to receive the most up-to-date information whenever they ask for it.

Results

In order to further describe various aspects of some systems of the invention, results of operations of some example prototype systems will be discussed below.

Barrier Computation

The controller 24 (FIG. 2) renders barrier strips 44 (FIG. 3) and scenes are modulated on the rear screen 42 as discussed above, with a barrier period that is continuously variable down to the theoretical minimum of one sub-pixel. In practice however, there are more restricted limits on the usable barrier range. These are a function of the physical front display screen 40, not the control scheme.

In some systems, one extreme has been found where barrier periods of larger than about 12 pixels become visible to the user and divert attention from the scene to the barrier strip 44, while at the other, periods smaller than about 4 pixels cause noticeable ghosting because the steering of a colored sub-pixel of the rear screen 42 is quantized by the front screen 40 to the nearest pixel only. Since the front sub-pixels are colored rather than white, light from a rear sub-pixel of a given color can be transmitted only through certain locations of the front barrier, this restriction is elaborated upon below.

View Distance Control

In a parallax barrier strip system of the invention, the ghost level, or percentage of crosstalk, can be measured with a photometer by rendering one eye channel completely white and the other completely black. The difference in light levels reaching the eyes is then converted to "percent ghost". In a static barrier system of the prior art, the ghost level is at a minimum at the optimal view distance and increases when the user approaches the near and far view distance limits of the system. This is a particular disadvantage at the near viewing limit, because users often prefer to be close to the screen in order to see details.

Figure 8:
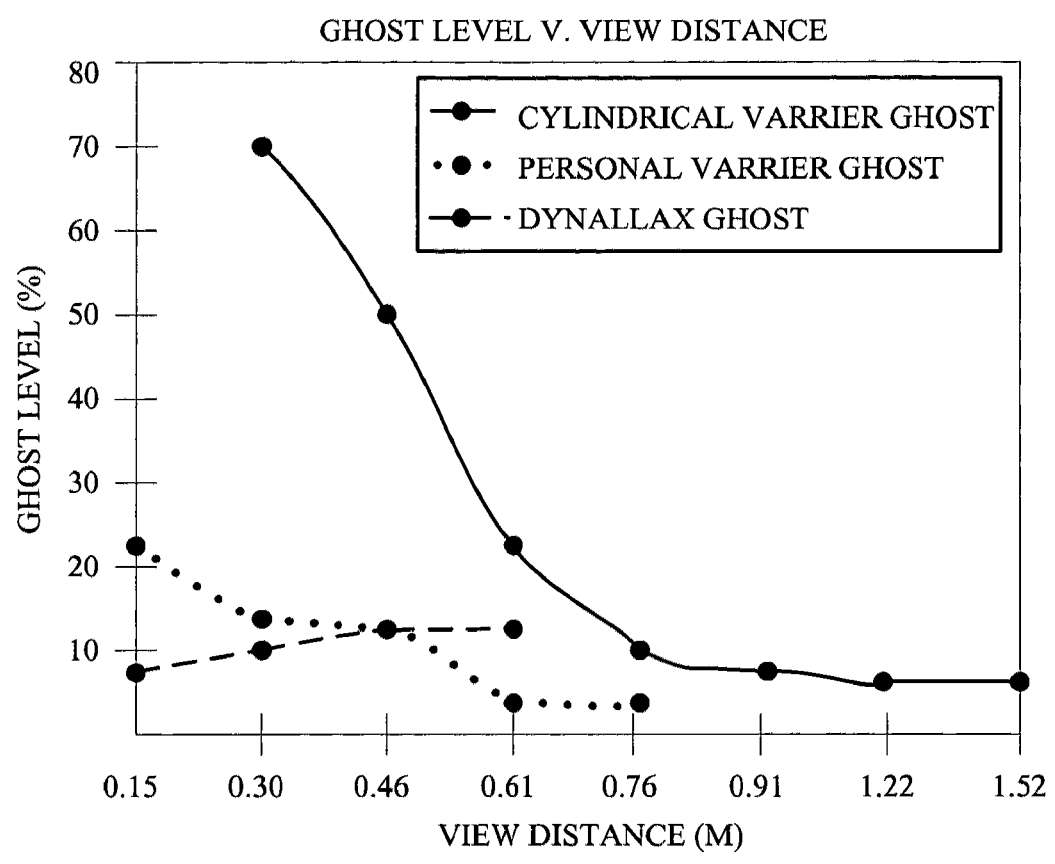
FIG. 8 is a data plot useful to compare results of operation of a system of the invention to those of the prior art.

In FIG. 8, the ghost level vs. view distance in the neighborhood of the near limit is plotted for two implementations of systems of the invention: a 35-panel tiled implantation (35 individual displays configured in a tiled arrangement in a cylindrical shape around a user) and a single desktop panel system. Because the example desktop system is a seated desktop display, its barrier is tuned to a smaller minimum distance than the 35-panel tiled display and hence its graph is shifted to the left, but the basic pattern is the same. On this is superimposed a graph of the ghost levels for a system of the prior art. All three systems have a comparable minimum ghost level of 5-7%, but the graph for systems of the invention does not spike upward at near distances, as do the fixed barrier system of the prior art. This represents a significant advantage over systems of the prior art.

Rapid View Steering

As discussed above, some systems of the present invention are configured for "rapid view steering" in which the controller 24 (FIG. 2) operates the front 40 and rear screens 42 (FIG. 3) in an asynchronous mode. It has been discovered that updating the front screen 40 at a faster rate than the rear screen 42, with an example being at least about twice as fast, offers advantages over the prior art in the ability to accommodate user movement, among others. Because this feature can not be required during all applications, systems of the invention are configured to allow rapid view steering to be disabled and to switch between the two modes when required or desired. When rapid view steering is disabled, the front 40 and rear screens 42 operate in lockstep with each other at the same frame rate. This is the case for at least some multi-user modes, for various performance tests, and in other applications. On the other hand, with rapid view steering enabled, each screen 40 and 42 is allowed to run as fast as possible and is updated with current data whenever the next frame is about to begin. Table 1 illustrates some example systems and frame rates:

TABLE 1

Frame rates for front and rear screens for various model sizes and rapid steering enabled/disabled

| Scene model | single polygon | Mars rover | head | skull |
| --- | --- | --- | --- | --- |
| # vertices | 4 | 15K | 130K | 220K |
| front screen frame rate, synchronous | 30 Hz | 30 Hz | 10 Hz | 3 Hz |

TABLE 1-continued

Frame rates for front and rear screens for various model sizes and rapid steering enabled/disabled

| Scene model | single polygon | Mars rover | head | skull |
| --- | --- | --- | --- | --- |
| front screen frame rate, asynchronous | 50 Hz | 50 Hz | 50 Hz | 50 Hz |
| rear screen frame rate | 30 Hz | 30 Hz | 10 Hz | 3 Hz |

The top row includes the names of virtual reality ("VR") simulations run on systems of the invention: "single polygon" is a three dimensional geometric sshape that is rotated, "Mars rover" is a simulation of driving the Mars rover an martian landscape, "head" and "skull" are medical applications simulating medical procedures performed on the head.

The purpose of rapid steering mode is to relax the sensitivity of parallax barrier AS VR to overall system latency. Consider the skull model in the right column of Table 1. To illustrate why this is the case, one can analyze the values in Table 1 by computing the maximum velocity ("v") of head movement permissible with and assume that head velocity v is limited by a maximum movement of one half of the interocular distance (32 mm) during the time that a frame is displayed. This limit is reasonable because stereo is lost at this point, the eyes have moved completely into the guard bands before the scene is updated. Meanwhile, the time required to render a frame when the head is moving is given by the reciprocal of the frame rate in Table 1 plus tracker and communication latency, measured to be a constant 65 ms for a similar tracking system and cluster arrangement. Given these values:

with rapid steering: v=32 mm/(65+20 ms)=0.38 m/s without rapid steering: v=32 mm/(65+333 ms)=0.08 m/s Accordingly, the resulting speedup is a factor of greater than 4 times the permissible head velocity v with rapid steering enabled. This illustrates one important benefit achieved through some systems of the invention.

Multi-User Mode

One important benefit of some systems of the invention is the ability to accommodate multiple users. In some systems of the invention, the controller 24 is configured to run the display element 22 so that two or more users can each see their own stereo perspective of a scene (or can view completely different images) by multiplexing four or more eye channels, directing one channel to each eye of each user, and setting the barrier period dynamically to minimize conflicts between the eyes and the virtual lobes. The number of users that can be accommodated by systems of the invention can depend to some extent on physical size of the display 22, the viewing space, and the like. It has been discovered, for example, that standard desktop scale systems of the invention can be used to accommodate two users. To accommodate 3, 4 or more users, larger scale systems will be useful.

With reference to a two user system of the invention, the barrier period for single user barrier at a view distance of approximately 0.6 m is 1.2 nm, so the minimum two-user barrier period would be twice as large, or 2.4 mm. However, as FIG. 8 demonstrates, in order to eliminate conflicts, barrier periods range from 2.9 mm to 5.2 mm for a variety of horizontal (x) displacements of the two users. Furthermore, FIG. 9 illustrates the irregular nature of the resulting barrier period function, reflecting the non-linearity of the underlying energy function in equations 5 and 6.

Figure 9:
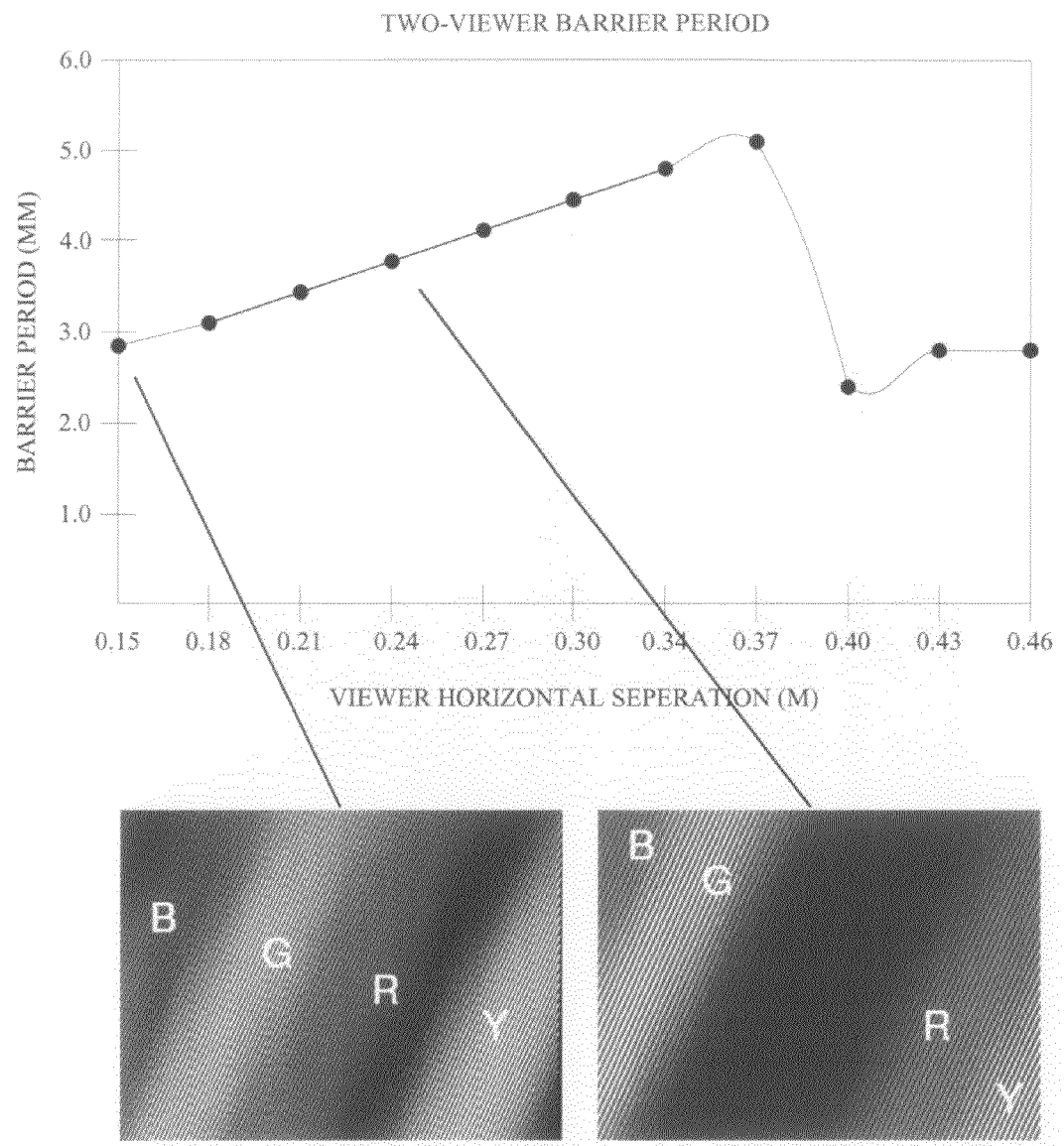
FIG. 9 illustrates results of a system of the invention operating in a multi-user mode.

FIG. 9 illustrates the result when two-user mode was tested using a prototype system of the invention with various separations between the users. The conflict energy minimization algorithm discussed above determines the non-linear barrier period function shown in the graph of FIG. 9. In the screen capture images of test patterns shown below the graph, a different color channel is coded for each eye (B=blue, G=green, Y=yellow, R=red). When the barrier period is near its minimum of 3 mm, the channels are compactly spaced as in the screen capture image shown on the lower left. As the period grows, so does the spacing, as shown in the screen capture image on the lower right. At a particular combination of user locations, channels are required to have a particular spacing in order to avoid conflicts between physical and virtual lobes.

It has been discovered that the linear search time is generally not a bottleneck, but large barrier periods, when they occur, can waste screen resolution. This is illustrated by the screen capture images in the lower portion of FIG. 9. A test pattern is rendered with a different color for each of the four channels, and then the display is photographed from further back than the intended distance so that all four channels are visible simultaneously. When the barrier period is near 3 mm as in the lower left image, the channels are compactly juxtaposed, but large guard bands between some channels result when the period is larger, as in the lower right image.

It appears that screen resolution is wasted when the barrier period and resulting guard bands expand, but this is required by the combination of positions of actual and virtual lobes in order to eliminate conflicts. It has been discovered that two improvements are possible to alleviate this condition. The baseline period for a single user can be reduced so that expansions due to two users begin with a smaller starting value. There are physical restrictions on the minimum possible single user period as is discussed herein below.

Another enhancement is that the controller optimization algorithm can trade-off some small level of conflict energy with barrier period size. The tuning of the controller algorithm can be optimized as is desired for a particular application and system. In some systems of the invention, for example, the algorithm continues to increase the barrier period until the conflict energy drops to zero. However, near-zero conflict energies can result in smaller barrier periods with little increase in ghost level, and one example alternate approach is to choose the smallest barrier period that result in some minimal conflict threshold. Some example systems of the invention are configured to maintain a minimum conflict level of about 0.04 inches (about 1 mm).

Figure 10:
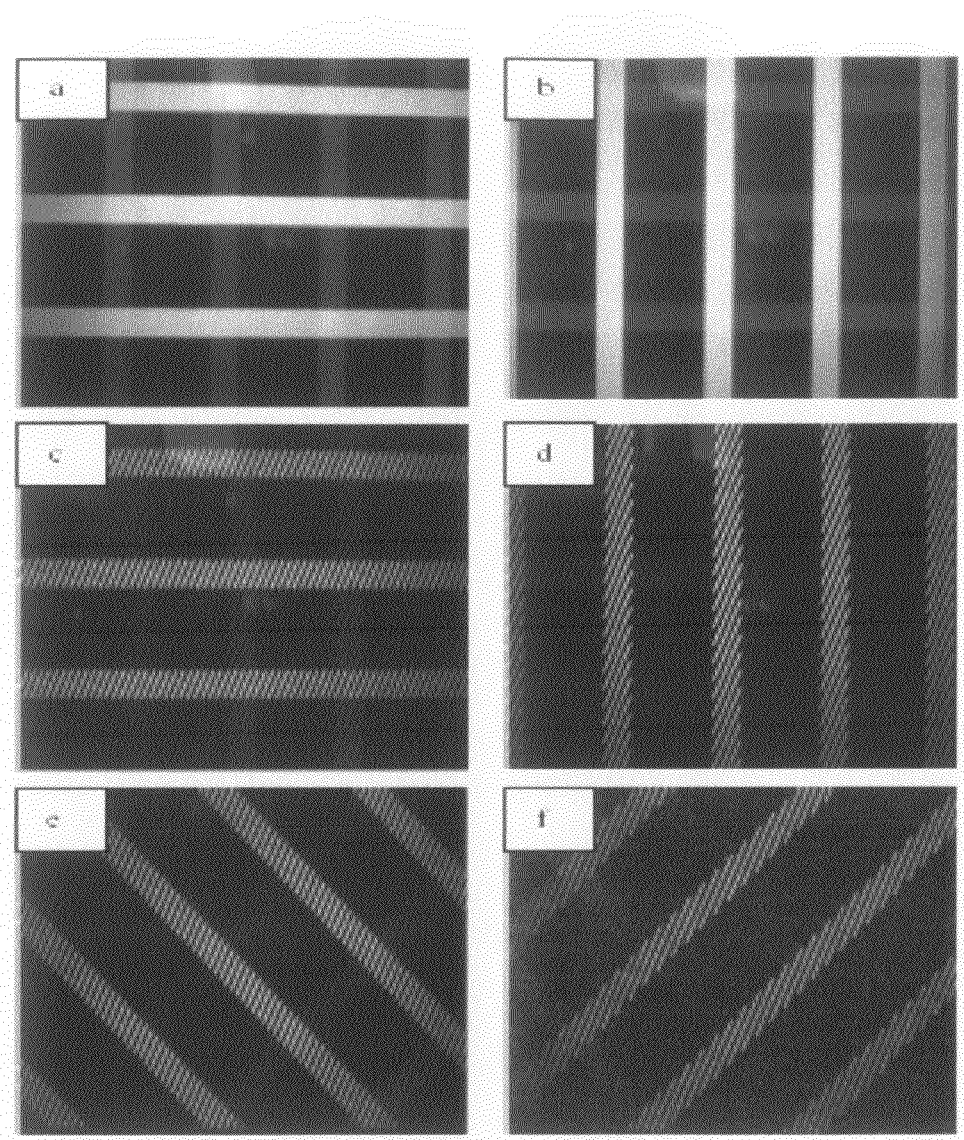
FIG. 10 illustrates results of a system of the invention operating in a multi-user mode.

In order to observe quality in two user mode, an experimental apparatus was constructed consisting of two video cameras, separated by an interocular distance of 63 mm and fixed to a jig, thereby emulating the eyes of one user at a known 3D position in space. In FIG. 10, a test pattern of vertical, horizontal, and angled bars is rendered for the various eye channels. In other words, each different angular orientation would correspond to a different eye's view of a VR scene in normal mode. The left column of FIG. 10 is the left camera (eye) view and likewise for the right column and camera (eye). In FIGS. 10(a) and 10(b), only single user mode is enabled and horizontal bars are seen by the left eye and vertical bars by the right. The dim bars of the opposite orientation correspond to a ghost level of approximately 7%. This is compared to FIGS. 10(c) through 10(f), where two-user mode is enabled. FIGS. 10(c) and 10(d) correspond to the first user while 10(e) and 10(f) correspond to the second. The positions of first and second users are fixed in this test and the cameras are re-positioned between users. Comparing single and two-user modes, ghost level is observed to decrease slightly, however the barrier strips become more visible as their period is increased.

Two Dimensional Imagery

As discussed above, some systems of the invention include a controller 24 (FIG. 1) causes the display 22 to be convertible between 2D and 3D modes. This can be useful, for example, to cause the display 22 to convert a 2d movie during some portions of interest into 3D to provide greater detail, more realism, or for other effects. Some systems of the invention allow a user to control when the transition occurs during a movie or other imagery, so that the user can determine when and what portions to view in 2D and which in 3D. Also, other example systems of the invention include a controller 24 and display 22 that are configured to simultaneously display 2D imagery and 3D imagery. These can be provided, for example, side by side on different portions of the display 22 screen. This can be useful, for example, to show a 2D tool bar, help text, wiring diagram, or other "flat" image portion while simultaneously illustrating a detailed 3D image. Or, a first user can choose to view imagery in 2D while a second user simultaneously views imagery (which is not visible to the first user) in 3D.

Conversions between 2D and 3D are accomplished by rendering the front screen 40 (FIG. 3) white (or a portion of the front screen 40), making it transparent, and rendering a single monoscopic view on the rear screen 42 (or on a corresponding portion of the rear screen 42). This versatility permits the user to multiplex VR and non-VR tasks within the same display, even to the extent that the display space can be partitioned to permit both tasks to be visible simultaneously. Since no glasses are required to experience the 3D VR scene, the user can seamlessly perform both 2D and 3D tasks. Also, it will be appreciated that systems of the invention can be useful to provide two or more individual 2D images to different users, without any 3D imagery ever included in the presentation. Further, in some applications a system of the invention can be used to provide a 2D image to a first user while simultaneously presenting a 3D image to a second user.

In typical static parallax barrier strip implementations of the prior art, a registration process is required to align the physical barrier either with the underlying pixel structure or in the case of systems of the invention, with the software's representation of the barrier computational model. Either way, it is a non-trivial process that is usually time-consuming, and the final quality of the system critically depends on the accuracy of this calibration process. This task is unnecessary in some systems of the invention as both front and rear screens are identical in structure, and the computational algorithms for both screens are highly correlated. However, if the front screen 40 (FIG. 3) were constructed from a different size and type of LCD than the rear 42 (as is the case in some systems of the invention), then a calibration process would be required.

Through the use of a dynamic parallax barrier, systems of the invention improve the sensitivity to rapid head movement, permit two or more pair of independent tracked perspective views, extend view distance range, and provide additional benefits and advantages. Some additional benefits include the ability to disable the barrier and the elimination of barrier registration. Results have been quantified by measuring ghost levels, frame rates, and capturing screen images with a pair of cameras positioned at known locations and separated by an average interocular distance.

Example Applications

Those knowledgeable in the art will appreciate that systems of the invention as illustrated above will have a wide variety of useful applications. Any application in which immersive and realistic 3D imagery is desirable can find benefits and advantages through use of systems of the present invention. Examples include, but are not limited to, science, engineering, architecture, educational, medical, training, gaming and wagering.

By way of specific examples, medical applications can include simulated surgery and other medical procedures where the tool 32 (FIG. 1) is used by a user as a virtual scalpel or other medical device. The tool 32 can be haptic so that some feedback is provided as the user uses it to virtually penetrate tissue, cut organs, clamp vessels, and the like. An image of the tool 32 can be rendered on the display 22 by the controller 24, with the image responding to motion as the tool 32 is actually moved and its position tracked by the tracking system 24. Or, in other applications, the tool 32 may not appear on screen but instead may be positioned between the user and display 22 so that it is viewed against the background of the imagery shown on the display 22.

Example Gaming and Wagering Applications

Other example applications include gaming and wagering wherein users interactively participate in a card game, game of chance, virtual gambling game, contest, sporting event, adventure, or other virtual event. It is believed that systems of the invention can provide benefits and advantages that will be particularly useful to such applications due to many of the unique aspects of systems of the invention as discussed herein above.

Figure 11:
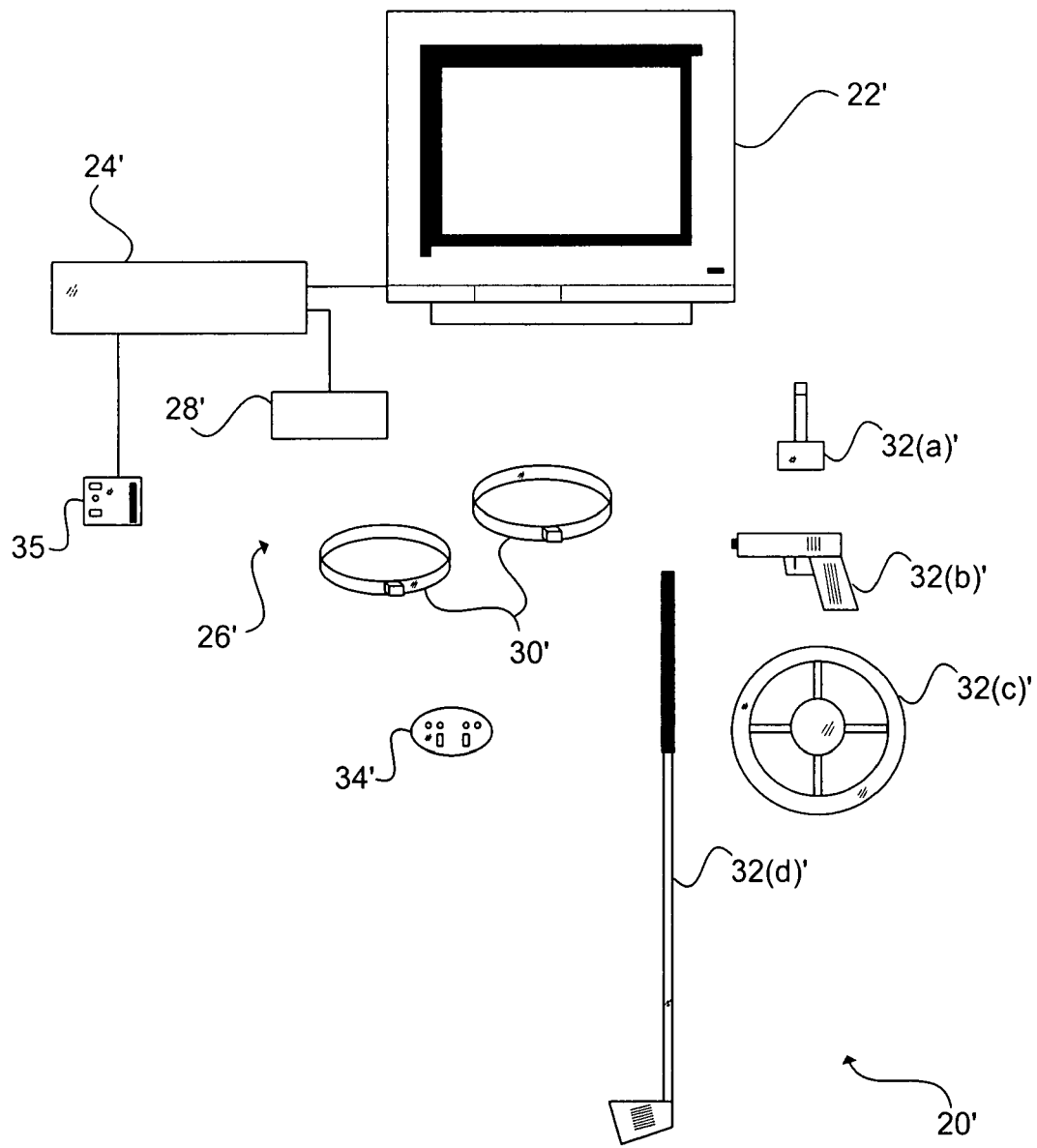
FIG. 11 is a schematic illustration of an example system of the invention configured for gaming and wagering applications.

FIG. 11 schematically illustrates such a system 20'. The system 20' is consistent in many respects with the system 20 shown and described above (e.g. FIGS. 2-3), and accordingly like element numbers have been provided using a "prime" single apostrophe designation. Description of these elements need not be provided to the extent that such description is consistent with that provided above.

In these applications one or more tools 32' can be provided and can function as pieces useful for interaction in the gaming or wagering applications. These can include, but are not limited to, such examples as a joystick 32(a)', weapons (e.g., sword, gun 32(b)', knife, etc.) vehicle driving tools (e.g., throttle, steering wheel 32(c)', foot pedal, etc.), gamepiece, sports equipment (tennis racket, baseball bat, golf club 32(d)') or other devices useful to interact with game or wagering imagery displayed on the display 22' though manipulation by a user. The tracking system 26' can be used to determine position, velocity, direction and otherwise receive data input from the tool 32'.

In the system 20', the keyboard 34 of system 20 (FIG. 2) has been replaced with a wireless, hand held data entry device in the form of handheld controller 34'. This controller 34' can include keypads, rollers, buttons, displays and other data input and output mechanisms. The controller 34' communicates with the controller 24' wither through a wired or wireless connection. This can be useful, for example, for users to interactively participate in a wagering application by selecting game options, placing wagers, selecting one or more games to play from a list of games, entering a security code, personal account information, and the like. In multi-user systems, multiple devices 32', 34' and 35' can be provided, with one each for each user.

For some gaming and wagering applications an interface 35 can be further provided for receiving payment from users and/or crediting users with winnings, awarding or charging points from a players' promotional card, and the like. The interface 35 communicates with the controller 24', which is configured to maintain an accounting of player wagers and winnings. Interface 35 can be, for example, a device having credit card functionality (such as a device for authorizing, charging and/or crediting a credit card or other physical payment element), a device for receiving and dispensing coins, tokens, tickets, coupons, vouchers, and the like. The interface 35 can provide payment to a user by dispensing tokens, money, a payment voucher, crediting a credit card, and the like. In such applications the controller 24 (FIG. 2) can control the payment processing interface, keep an accounting of player accounts, control game play and outcome, and the like.

Wagering imagery can include sporting events viewed in 3D by one or more users (e.g., virtual horse, auto or other vehicle races, boxing matches, golf, baseball, football, basketball, etc.) with the users able to make wagers on and/or participate in the event. Other examples include virtual poker or other card games, keno, bingo, craps, roulette, black jack and other games of skill and/or chance. A virtual slot machine can include virtual reels with symbols about its circumference that are made to spin and stop with differing combinations of the symbols shown. Virtual dice can be thrown, a virtual roulette wheel spun, and the like. The virtual game can be presented in 3D on the display 22'. Advantageously, multiple of these applications can be offered by a single system 20', with one or more users allowed to choose which particular imagery to be displayed. In this manner a single system 20' can provide a "virtual casino" capable of playing multiple different games. Cost and space savings can therefore be achieved.

The controller 24' in wagering and gaming applications is controls the gaming and to produce a game outcome according to a selected probability. As an example, in a wagering application the controller 24' can provide a player with a winning outcome at some selected probability (e.g., 49% of the time), or to pay out a specified portion of wagers made (e.g., payout a total of 95% wagers collected). The selected outcome probability can be programmed or otherwise specified by an operator, administrator, or the like. A security code or key can be required to do so. The controller 24' maintains an accounting for players' wagers and winnings, and to pay out accumulated winnings on command.

In other example systems of the invention, the system 20' can be connected to a network whereby players operating it can have wagers and winnings credited and debited from a central account over the network. The player can log into the network using data entry keypad 34', a personal identifier such as a pass card usable in device 35', or through other interfaces. In this manner a plurality of systems 20' can be used by a casino or the like and linked together for the convenience of players.

Systems 20' used for wagering or gaming applications can achieve valuable benefits and advantages through the realistic and immersive 3D imagery shown on the display 22. The imagery can be provided in a large scale, on one or more displays arranged in a 180° or 360° perspective about the user, or other configuration that is useful to provide a realistic and immersive gaming or wagering experience. Cards, slot machine wheels, racing horses or vehicles, or other imagery can appear to "float" in space on the display 22'. In multi player games such as poker, craps, and the like, a user may find himself at a virtual table with other virtual players. In other example systems 20', a virtual horse or vehicle race may be observed and the outcome wagered on.

As with other systems discussed herein above, systems 20' configured for wagering applications can provide simultaneous use by more than one user, with each user able to observe different 3D imagery through the operation and elements of systems of the invention as discussed above. This can be useful in wagering and gaming applications for two, three or more users to compete or play games with one another. A system 20' could be configured, for example, for a virtual poker, black jack, or other game in which two users are virtually dealt different hands of cards that are not visible to one another. Other virtual players can likewise be at a virtual table competing with the two users.

In a gaming application, two or more users using the system 20' can compete with one another or participate in the same adventure or game. 3D imagery for each user or player will be different. Other systems 20' of the invention can offer competition between different users, and can provide for wagering. By way of example, a game of skill can be played by two users with the outcome wagered on. The display 22' can show 3D imagery such as a virtual golf, tennis, baseball, target shooting, or similar game, for example, in which two users compete. The tool 32' can be replaced by a virtual golf club, tennis racket, baseball bat, gun, or other gamepiece that can be manipulated (e.g., swung or shot) during game play. Scores can be kept, and the outcome wagered on. In some gaming applications an image or each user can be rendered and displayed to the other user.

Many other gaming and wagering examples will be apparent to those knowledgeable in the art that will find useful benefits and advantages in use of systems of the invention. For example, it will apparent to those knowledgeable in the art that systems 20' of the invention configured for carrying out a gaming or wagering application can benefit from the rapid steering control, view distance control, image computation, multiple user barrier control, synchronous/asynchronous modes, and other elements of the invention discussed above. By way of particular example, benefits and advantages can be achieved through providing a systems such as the system 20' that is configured for use by two, three or more users in gaming applications. Traditional slot machines, video poker machines, and similar gaming and wagering applications, for example, are typically configured for individual play. Example game systems of the invention can provide play for two, three or more simultaneous players.

Example Haptic Systems of the Invention

Systems of the invention described herein above have generally included a display that is viewed directly by a user. The present invention is not limited to such a configuration, however. Other example systems of the invention include viewing of the display through reflectance on a half mirror or the like. One such embodiment of the invention is a compact haptic and augmented virtual reality system that produces an augmented reality environment. The system is equipped with software and devices that provide users with stereoscopic visualization and force feedback simultaneously in real time. High resolution, high pixel density, head and hand tracking ability are provided. Well-matched haptics and graphics volumes are realized.

In an embodiment of the invention, a personal display device and a partially transparent mirror are used to recreate an augmented reality environment. Real time head and hand tracking enhances graphics-haptics collocation and improves immersion and realism. A software library provides a high level layer that encapsulates the rendering of the scene graph. Hand and head sensors provide information permitting the system to determine a user's movements in a presented virtual environment. A haptic device provides force feedback to the user based upon interactions with the virtual environment. An audio system provides 3D spatial audio.

Such embodiments of the invention provide a number of advantages. They provide an interface that includes vision, touch, and hearing simultaneously, and offer real time head and hand tracking, which improves immersion and realism. Embodiments of the invention use a display such as the display 22 of FIG. 2 rather than a projector, which can provide for high resolution, e.g. 1600×1200 @100 Hz. Embodiments of the invention provide for a wide range for a user's point of view, and incorporate components, for head and hand tracking, tracking and rendering that can run on a personal computer. Example embodiments of the invention also permit haptics and graphics volumes that substantially perfectly or perfectly match. Embodiments of the invention also permit the inclusion of text and menus that can be read normally. The visual acuity, collocation, user positioning and freedom, and other features of devices in accordance with embodiments of the invention provide a comfortable user experience that avoids fatigue and dizziness that can occur in use of other systems. Image data for the graphics environment in preferred embodiment devices can be accepted from an image acquisition system that generates image data for an image volume processing system. Also, multiple users can be accommodated in a single system.

Some particular example embodiments of the invention will now be discussed with respect to FIGS. 12-14. Features in these drawings are not to scale, and features may be exaggerated for emphasis. Artisans will understand software and hardware features of the example embodiments from included block diagrams. Artisans will also understand broader aspects of the invention from the following description of preferred embodiments.

Figure 12:
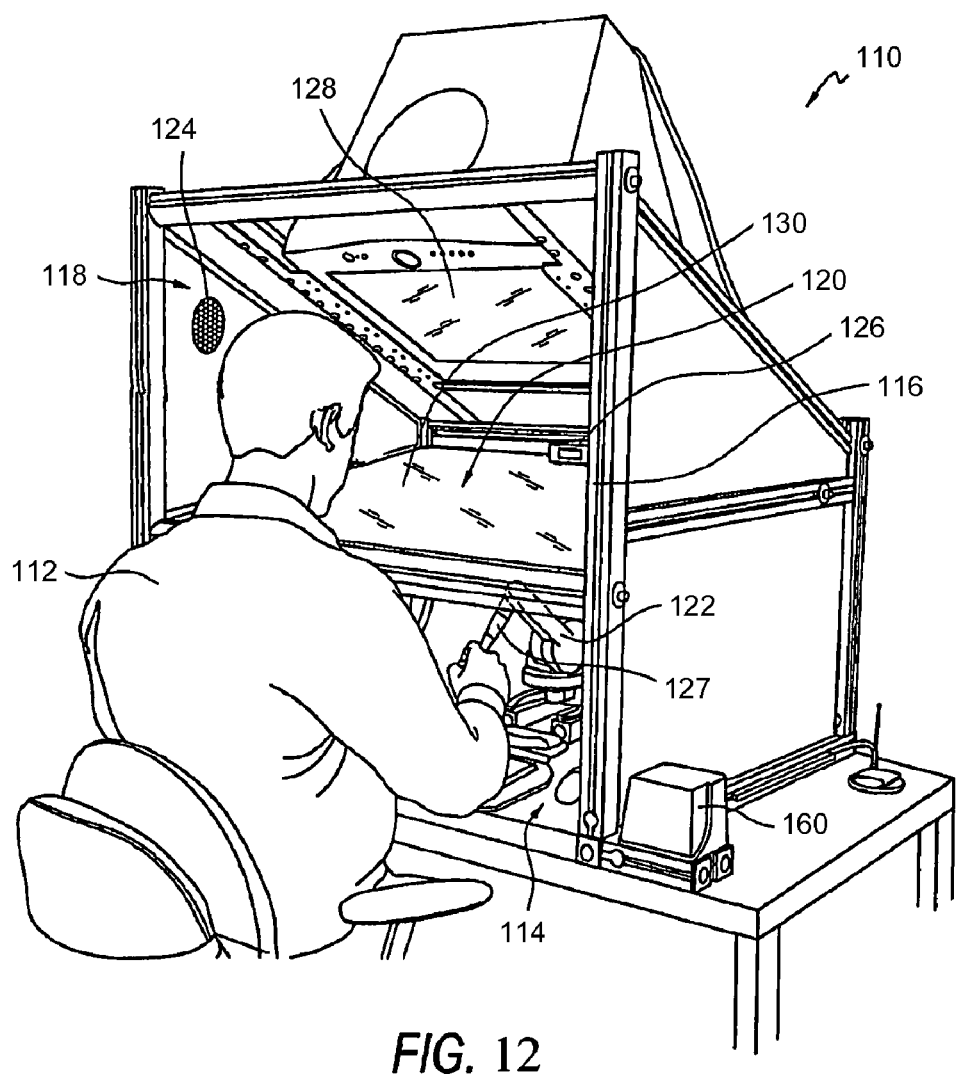
FIG. 12 is perspective schematic view of an example embodiment compact haptic and augmented virtual reality system of the invention.

FIG. 12 illustrates an example embodiment compact haptic and augmented virtual reality system 110 of the invention. A user 112 sits comfortably at a physical desktop workspace 114 defined by a housing 116 that has an opening 118 on one side. Preferably, the physical desktop workspace 114 is disposed at a height that permits the user 112 to sit at the physical desktop workspace 114. In other embodiments, the physical desktop workspace 114 is arranged to permit a user to stand. However, a comfortable sitting position reduces fatigue when using the system 110.

The system 110 includes a multi-sensorial computer interface that includes a stereoscopic vision interface 120, a haptic touch device 122 and a 3D sound system 124. Additionally, a head tracking device 126 and a hand tracking device 127 provide information regarding the user's interaction with the system as well as the user's visual perspective relating to the system 110. Advantageously, the head tracking device 126 will track a liberal amount of head movement and provide the system with information permitting adjustment of a virtual reality display presented to the user 112 to account for the changed visual perspective of the user.

A graphical environment is provided by a high-resolution display screen 128 positioned by the housing 116 with respect to a partially transparent mirror 140, e.g., a half-silvered mirror. The partially transparent mirror 140 permits the user 112 to see both the virtual reality display and the user's hands, which use the haptic touch device 122 below the mirror. The level of transparency/reflection is not critical. With more reflection, the virtual display is brighter and the hands will appear darker. Thus, for example, 70% reflection and 40% transmission produce a brighter graphics display and darker hand appearance than a partially transparent mirror that has 60% reflection and 40% transmission.

In the preferred embodiment, the partially transparent mirror 140 and the display screen 128 are oriented by the housing 116 to have the user 112 looking directly at the haptic tool 122, e.g., a stylus, at the origin of the haptic coordinate system. A line between the position of the eyes as determined by the head tracking 126 and the center of the haptic workspace is determined. The virtual projection plane should be located exactly at the center of the haptic workspace and oriented perpendicular to that line. A virtual projection plane angled at 45° with respect to the physical desktop workspace 114 achieves this placing of the virtual projection plane. The plane of the partially transparent mirror 140 corresponds to the bisector of the angle between the display screen 128 and the virtual projection plane. The partially transparent mirror 140 and the display screen are arranged by the housing 116 in the preferred embodiment to position the virtual projection plane at 45° from the physical desktop workspace 114.

The partially transparent mirror 140 should be sufficiently wide to allow the user to view virtual objects from different viewpoints (displaying the correct user-centered perspective) while permitting a comfortable range of movement. In a preferred embodiment, a 29"×21" partially transparent mirror used with a 22" high resolution display 128 permit the user 112 up to about one foot of head movement to the left and right without breaking the visual illusion, providing a 2 foot movement range. Larger dimensions can be useful to accommodate more than one user 112.

The display 128 can be the display 22 of FIG. 2 (and FIG. 3) discussed in detail above, and can further include the controller 24 and all its functionality. The display 128 thereby includes first and second displays in a stacked configuration that provide a parallax barrier 3D image. The image provided can be modified to some extent to accommodate for the half mirror 140. The display 22 and controller 24 (FIGS. 2-3 and others) described above are configured to provide 3D imagery to a user watching the display directly. When a user such as the user 112 views the display 128 through reflectance from the half mirror 140, some accommodation may be required to account for the different sight line travel between the users' eyes and the screen of the display 128. These issues can be attended to through processing performed, for example, by controller (e.g., controller 24 of FIG. 2) and will be predictable through knowledge of the angles of orientation of the half-mirror 120, the user 112 position, and the like.

In this way, the high resolution display screen 128 and partially transparent mirror 140 are positioned by the housing 116 to create an augmented reality environment that integrates the user's hands with virtual 3D models in the physical desktop workspace 114. In the preferred embodiment, the multi-sensorial computer interface is implemented with single computer 132 (see FIG. 14, not shown in FIG. 12), which can include the functionality of controller 124 of FIG. 2.

The computer 132 makes use of a software library that provides, in real time, a high level layer that encapsulates the rendering of a scene graph on the display screen 128, the stereoscopic vision interface 120, the handling of the head tracking device 126 and the hand tracking device 127, an interface with the haptic touch device 122, and playback of 3D spatial audio on the 3D sound system 124.

Figure 13:
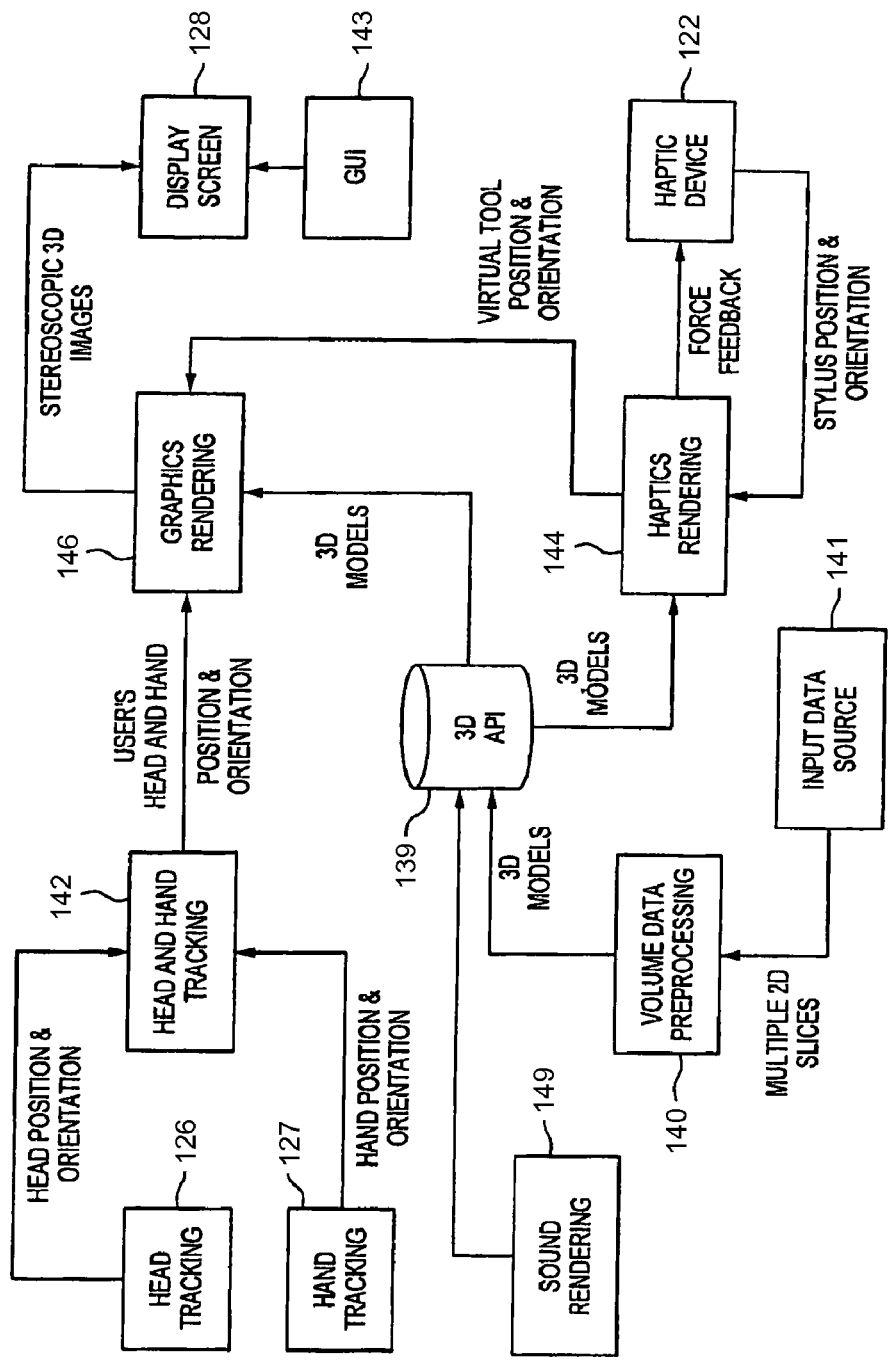
FIG. 13 is block diagram of an example software and hardware architecture for a preferred embodiment compact haptic and augmented virtual reality system of the invention.

Referring now to FIG. 13, a software and hardware architecture of an example embodiment compact haptic and augmented virtual reality system 110 is shown. The architecture includes interconnected devices and software modules, which are integrated by a 3D application program interface (API) 139.

Figure 14:
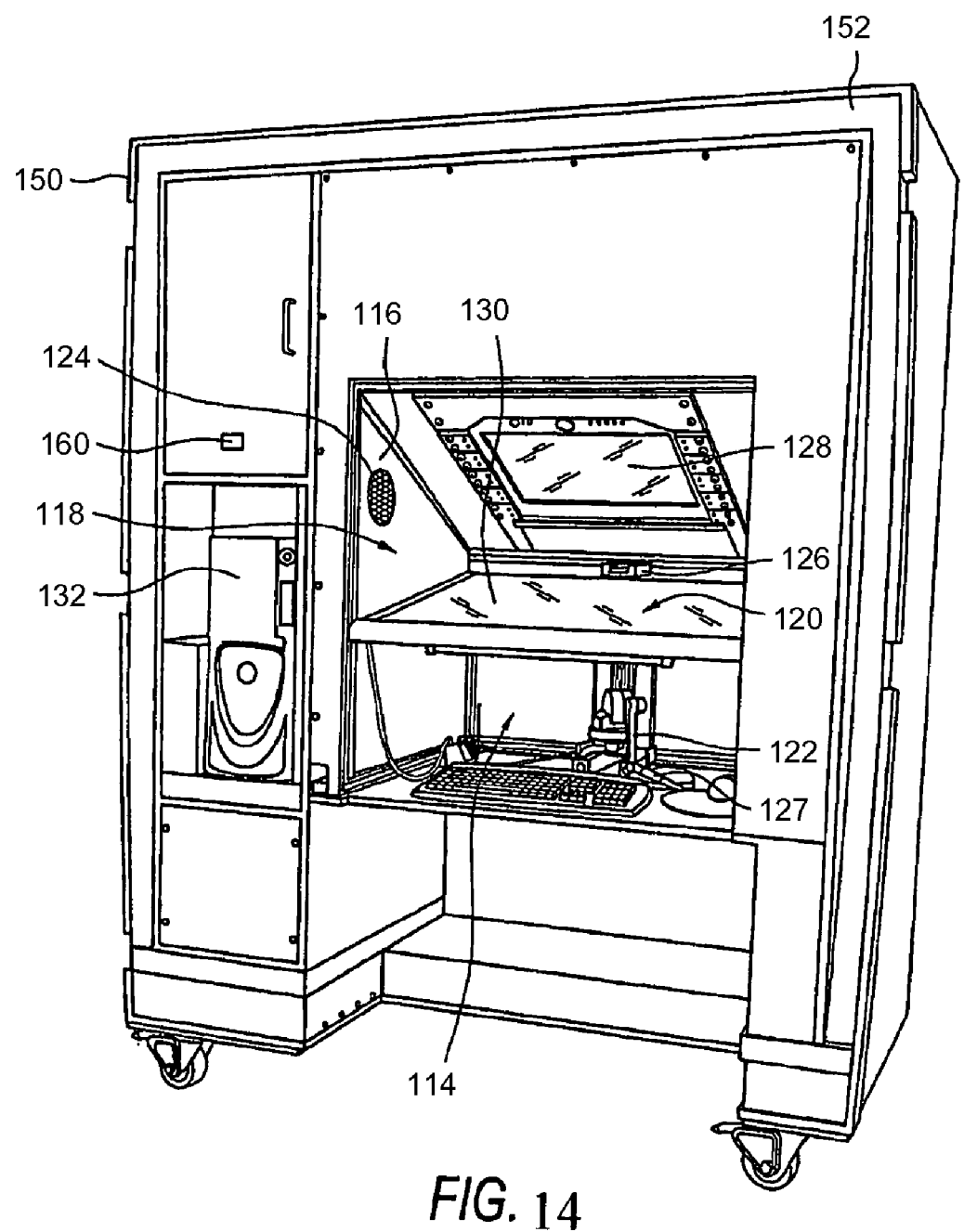
FIG. 14 is perspective schematic view of another example embodiment compact haptic and augmented virtual reality system of the invention.

While systems of the invention can include previously generated graphical data for the presentation of virtual reality graphics on the display screen 128, FIG. 14 includes software and hardware for generating image date from physical models. Specifically, volume data pre-processing 140 takes 2D images during a pre-processing phase from an input data source 141. The volume data pre-processing can receive 2D image data, for example, generated by an input data source 141. The volume data pre-processing 140 provides 3D models to the 3D application program interface 139.

Example input data sources for characterizing physical objects are MRI or CT scanners, typically used for obtaining medical images. Gaming and wagering application image data are further examples. The volume data pre-processing 140 segments and combines the 2D images to create a virtual 3D volume of the sample that was scanned, for example a human head. In an example embodiment for medical images that could be used, for example, for surgical training, the volume data pre-processing 140 creates detailed 3D structures. The structures can be layered, as well, not just having an external shape, but having internal structures that can be revealed by operations with the haptic touch device 122, which can be used to make virtual cuts, or drill holes, or the like in an object or objects in the virtual reality environment.

For example, in the case of a virtual human head, polygonal isosurfaces corresponding to the skin, bone, brain and ventricles can be extracted from the 3D volume and exported. A file format that permits specification of 3D models is used. In preferred embodiments, the data is extracted and exported as virtual reality modeling language (VRML) files, which has the advantage of being supported by a number of open-source programs. In other embodiments, different file formats permitting specification of 3D models are used, for example. X3D for MPEG-4 data. 3D modeling file formats generally permit specification of polygonal surfaces and also their characteristics, e.g., surface color, image-mapped textures, shininess, transparency, hardness. The characteristics of the various isosurfaces will, with the interface to the haptic device 122, present different feel characteristics in the virtual reality environment, e.g. skin will feel soft and bone hard. A graphical user interface 143 includes, for example, text and menu interface provides for mouse and keyboard driven menus.

VTK 4.5 is standard software that can be used, for example, for volume pre-processing 140. The Visualization ToolKit (VTK) is an open source, freely-available, cross-platform C++ library that supports a wide variety of advanced visualization and volume processing algorithms. VTK can be used to read and process volumetric data obtained by Magnetic Resonance Imaging (MRI) or Computer Tomography (CT) scanners, applying a marching cube algorithm to generate isosurfaces from certain sections of the volume with homogeneous density. The isosurfaces generated with VTK are polygonal meshes that can be quickly rendered and manipulated in real time.

Since the monitor image is horizontally flipped, the image reflected on the mirror can be read normally. Therefore, any library can be used create the graphical user interface (GUI) 143. A Fast Light ToolKit (FLTK) is an example preferred library because it is a small and modular freely-available cross-platform C++GUI that supports 3D graphics via OpenGL® and its built-in GLUT emulation. FLTK is useful for the mouse and keyboard driven menus. With FLTK all of the usual widgets can be used to develop applications (menus, buttons, sliders, etc.). It also has a Fast Light User-Interface Designer (FLUID), which is useful to easily draw the user-interface and to define functions, classes and variables as needed. FLUID creates C++ source and header files that can be included in our application.

Head and hand tracking software 142 interacts with the head tracking device 126 and the hand tracking device 127. In a preferred embodiment, the head tracking device 126 includes a receiver that receives information from an electromagnetic sensor attached to or associated with a user's head, e.g., the headband sensor 30 of FIG. 2, worn by the user 112. The electromagnetic sensor tracks the user's head to compute the correct user's perspective while the user 112 moves his/her head around the virtual display, as a user would naturally do when working with a real object, e.g. a machine part, a human head or hand, etc. Similarly, the hand tracking device 127 can be an electromagnetic sensor attached to the haptic device 122 that cooperates with a transmitter 160. In an example surgical simulation virtual reality display, for example, the hand tracking device can be a SpaceGrip haptic device that tracks a surgeon's hand to define, e.g., a cutting plane and a light source.

In one example embodiment, pciBIRD standard software is used for head and hand tracking. pciBIRD, is powered by the PCI bus, which is currently available in most new computers. As preferred embodiments of the invention are implemented on a single computer, it is advantageous to have the tracking devices hooked directly up the computer. This eliminates latency that can be caused by the network communication from a "tracking" PC to a "rendering". In example embodiments of the invention handling complex 3D human head models and virtual surgical tools, a single dual-processor computer was able to handle graphics and haptics rendering, as well as the head and hand tracking.

Haptics rendering software 144 monitors and controls the haptic device 122. The haptics rendering software 144 reads the position and orientation of the haptic device 122, for example a stylus, or a plurality of styluses for different functions or for use by separate hands, and computes collision detections between a virtual device corresponding to the haptic device 122 and objects within the 3D virtual environment. The haptics rendering software 144 also receives 3D models from the 3D application program interface 139. For example, collisions with a virtual device and imported 3D isosurfaces are computed, and the haptics rendering software directs the haptic device 122 to generate the corresponding force feedback. In preferred embodiments, each isosurface is assigned different haptic materials, according to certain parameters: stiffness, viscosity, static friction and dynamic friction. Therefore, the user 112 can "feel" the different surfaces and textures of objects and surfaces in the virtual environment. In an example embodiment surgical simulation, the user 112 can, for example, feel different stiffnesses, viscosity, static friction and dynamic friction of skin, bone, and internal organs, such as the brain. In an example embodiment, the graphics and haptics are on two separate pipes, which can be implemented, for example with a dual processor computer. In an example embodiment, the haptics and graphics have their own update schedule, for example, haptics at 1000 Hz and graphics at about 40 Hz. In that example, the system would synchronize the two consecutive graphics update after about every 40 haptic updates, and it is within the skill of artisans to modify the manner in which haptics and graphics update and synchronize.

As an example, a certain viscosity effect is felt through the haptic device 122 as a corresponding virtual catheter passes through the gelatinous parenchyma of the brain. As soon as the virtual catheter breaks the dense ependymal ventricular lining, the viscosity effect ceases, providing the user 112 conducing a surgical simulation with the distinct "popping or puncturing" sensation.

Example software for the haptics rendering software is GHOST 4.0 standard software and an example haptic devise is the PHANTOM® haptic device. The General Haptic Open Software Toolkit (GHOST) is a cross-platform library commercialized by SensAble Technologies. VRML is necessary to transfer 3D models from VTK to the haptic library and Coin. GHOST aids interactions with a PHANTOM® haptic device and to compute the collision detection. GHOST permits defining different haptic materials to each 3D object in a virtual scene specifying four coefficients: stiffness, viscosity, static and dynamic frictions. Once a collision between the tip of a virtual tool held by the user 112 and any virtual object is detected, GHOST computes the reaction and supplies forces the haptic device to give the user the illusion of touching the object. Both Coin and GHOST are synchronized with the head tracking system so the user can see and touch exactly at the same 3D point, no matter from which viewpoint he/she is looking.

Another issue to be considered is the location of the transmitter of the electromagnetic tracking system. pciBIRD, used in example preferred embodiments, lacks a mechanism to synchronize I/O reading with the monitor refresh rate (unlike pcBIRD, miniBIRD, nest of Bird, and Flock of Birds). If the transmitter is located close to the display screen 128, it can incorporate magnetic noise to the display screen 128. On the other hand, if the transmitter is located far away from the receivers, then the accuracy of the tracking system decreases while its jitter increases. The pciBIRD is Windows and Plug & Play compatible. It provides positions and orientations of the user's head and hand. In the example embodiment system, it assists in provided perfect or substantially perfect graphics/haptics collocation; to provide a more natural interaction with the 3D virtual models. In order to minimize the noise caused by the CRT, the measurement rate is set to 85 Hz, which is different from the monitor horizontal refresh rate (100 Hz).

Hand tracking is very useful because it allows users to use both hands to interact with the virtual scene. While the user 112 can feel tactile sensations with a hand holding a haptic stylus, it is also possible to use a tracked hand to move the 3D objects, manipulate lights, or define planes in the same 3D working volume. In an example embodiment, for hand tracking, the SpaceGrips® that holds a pciBIRD receiver is used, and provides access to 4 buttons through a serial port. FIG. 14 shows the optimal location for a transmitter 160 (at one side of the device housing 116), which affords sufficient tracking display screen 128.

Graphics rendering software 146 receives 3D models from the 3D application program interface 139. The graphics rendering software further receives hand and head position and orientation information from the head and hand tracking software 142. Also, the graphics rendering software 146 receives virtual tool(s) information from the haptics rendering software 144. With the models and other information, the graphics rendering software 146 software generates and continuously updates, in real time, the stereoscopic 3D display that is displayed by the display screen 128. This can include, for example, generating the front screen 40 and rear screen 42 (FIG. 3) imagery as described above with regard to the display 22.

In one example embodiment, the graphics rendering software 146 is Coin 2.3 standard software. Coin is an open source high-level 3D graphics library that uses scene-graph data structures to render real-time graphics. It is an Open Inventor implementation, ideal to develop scientific and engineering visualization applications. Coin is free under the GPL for Free Software development, and requires an annual fee per developer for commercial use. VTK also has graphics rendering capabilities. However, Coin is optimized for real-time polygonal rendering and provides more sophisticated interaction nodes. Therefore, in some embodiments a separate graphics rendering, such as coin is used for rendering the isosurfaces generated with the visualization tool kit VTK (the volume data pre-processing 140). However, in other embodiments, the 3D API also handles the rendering and separate graphics rendering software is not required. Additional processing may be required to configure the 3D imagery for display in the parallax barrier format required by the display 22 of FIG. 2.

The API 139 provides a camera node that computes the correct user-centered perspective projection on the virtual projection plane. It properly renders both left and right views according to the position and orientation of the user's head given by the tracking system.

An example embodiment, as has been mentioned, is a surgical simulation. In the example embodiment, the virtual 3D environment is organized as an Open Inventor scene graph that includes the imported 3D isosurfaces, a light source controlled by the haptic device 122 (with reference to hand tracking 127), a the cutting plane manipulator also controlled by the haptic device 122 (with reference to hand tracking 127, and a perspective camera node controlled by the head tracking 126. The camera node displays both perspectives of the user's eyes according to the position and orientation of his/her head. The scene graph is traversed and displayed using a frame sequential (active) stereo technique on the high resolution display screen 128.

The display screen 128 in an example embodiment is a high display resolution is consistent with the display 22 of FIG. 2. The display screen 128 is set up to automatically produce a display that includes properly oriented text when shown by the image reflected on the partially transparent mirror 140. One option is to use a hardware video converter between the graphics card and the display screen 128 to mirror the image. The video converter must support the resolution of the display screen. Automatic horizontal flipping of the image on the screen 128 can be accomplished, for example, by an external firmware, software, or hardware module to the monitor.

Sound rendering 149 is also used in preferred embodiments to add auditory simulations to the virtual environment. Example preferred sound rendering software is Open Audio Library (OpenAL), is a freely-available cross-platform 3D audio API that serves as a software interface to audio hardware. OpenAL is can generate arrangements of sound sources around a listener in a virtual 3D environment. It handles sound-source directivity and distance-related attenuation and Doppler effects, as well as special effects such as reflection, obstruction, transmission, and reverberation. The OpenAL works fine with a pair of regular loudspeakers, however, the partially transparent mirror 140 presents a barrier for certain high frequency sounds. A more realistic sound experience can be obtained by having the user 112 wearing headphones. Because the user's head position and orientation are monitored, listener-centered 3D audio can be rendered in a similar to the rendering of stereoscopic user-centered perspective projection. This provides a comprehensive graphics/haptics/audio collocation.

A system of the invention can be calibrated. Since the projection plane is virtual, a physical measurement is very cumbersome to perform. The head tracking 126 and hand tracking 127 can both be used for calibration, or either one can be calibrated separately. A tracking sensor (receiver) is held at the projection plane until it is superimposed with a point displayed at the center of the projection plane. Then, this position is given by the tracking system. The measurement of the offset from the center of the haptic workspace to the transmitter can be done interactively moving the haptic device and leaving the graphics rendering fixed until the haptic stylus coincides with the virtual probe. This can be done only at the center of the projection plane. For a better calibration, this can be repeated at a plurality of points in the haptic workspace to create a correction table. Interocular distance, offset from the head sensor to the center of the head, as well as the offset from the hand sensor to the center of the haptic device 122 can be specified manually through the graphical user interface.

Another embodiment is shown in FIG. 14. The FIG. 14 embodiment is similar to the FIG. 12 embodiment, but the virtual reality system is completely housed in a portable, rugged cabinet 150. The cabinet 150 includes padding 152, and the physical desktop workspace 114 is fixedly mounted within the cabinet to place all system components in their operational position. The cabinet 150 can be sealed and closed with a cover, permitting ready transport of the system, and also permitting the system to be pre-assembled for shipping.

Systems of the invention can be used with many 3D models, and new models can be easily created for use in the system. Applications include those already mentioned. Additional examples include, mechanical procedures, manufacturing training, and many others. Artisans will recognize limitless applications and simulations that can be readily conducted with devices of the invention.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims. By way of example, it will be appreciated that elements of one system of the invention can be used in other systems of the invention. The tracking system described with reference to the system 110, for example, can be useful with the system 20. Or, the haptic device 122 of FIG. 14 can be useful in the system 20 of FIG. 2, and can, for example replace the tool 32.

Also, it will be appreciated that although systems of the invention have been described herein, the present invention is not limited to systems only and may also include methods and program products. In describing the systems of the invention discussed above, methods and program products of the invention will be apparent to those knowledgeable in the art. A method of the invention, for example, may include steps of operating a system of the invention and/or steps taken by a controller of the invention. A program product of the invention may include computer readable instructions stored on a computer readable memory useful to cause a computer to carry out steps of operating a system of the invention.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

We claim:

1. A dynamic parallax barrier autostereoscopic gaming system, comprising:
    a display that generates front and rear displays each in a different image plane, said front display providing dynamic barrier strips with transparent regions therebetween, said rear display providing images viewable through said transparent regions, said front display includes a front liquid crystal display plane, said rear display includes a rear liquid crystal display plane, said front liquid crystal display plane providing said dynamic barrier strips with said transparent regions therebetween, said rear liquid crystal display plane providing said images viewable through said transparent regions so as to provide three-dimensional imagery;

a tracking system that tracks the respective position of at least a first user and a second user;

a controller that controls the display for displaying said dynamic barrier strips and said images, wherein each of said first and second users views different imagery, said controller further communicating with said tracking system and dynamically controlling said display in response to movement of one or more of said first and second users, said controller communicating with said display and causing said display to simultaneously display different three dimensional imagery to each of said first and second users, said controller being further configured to determine an outcome of a wagering game; and an interface that receives wagers from users to play said wagering game.

2. An autostereoscopic parallax gaming system of claim 1 wherein said controller further controls said display to display both of a two-dimensional imagery and said three-dimensional imagery to said first and second users.

3. An autostereoscopic parallax gaming system of claim 2 wherein said controller causes said display to display said two dimensional imagery to said first and second users simultaneously with said three dimensional imagery, said three dimensional imagery being displayed on different portions of the rear one of said image planes.

4. An autostereoscopic parallax gaming system of claim 1 wherein said barrier strips define a barrier period, and wherein said barrier period is optimized for each of the different images according to the distance that each of the at least a first and second user is from said display according to the relation:

$$p/t=(2e-p)/(d+l)$$

where:
p=barrier period
t=optical thickness between front and rear screens
e=interocular distance
d=normal distance from eyes to front screen plane.

5. An autostereoscopic parallax gaming system of claim 1, wherein said controller in causing said display to display said different images is configured to generate at least two pairs of left and right rear screen channel images and to dynamically render said barrier strips in a spatial arrangement with said rear screen channel images to result in at least two simultaneous autostereoscopic images being perceived by said first and second users, said controller further causing said display to display one each of said autostereoscopic images to one each of said first and second users as said users move relative to said display element.

6. An autostereoscopic parallax gaming system of claim 1 wherein said barrier strips define a barrier period, and wherein said controller dynamically sets said barrier period to minimize conflicts between eyes of said at least a first and a second user and virtual lobes.

7. An autostereoscopic parallax gaming system of claim 1 further comprising at least one tool linked to said controller and configured to be manipulated by the at least one of said first and second users to thereby interact with said images displayed to each of said first and second users.

8. An autostereoscopic parallax gaming system of claim 7 wherein:
said at least one tool comprises at least a first and a second tool, said first tool for being manipulated by said first user and said second tool for being manipulated by said second user;
said controller causing images of each of said first and second tools to be displayed on said display and to dynamically change said images of said first and second tools in response to manipulation of said first and second tools by said first and second users, respectively; and
said controller causing said display to display said first tool image only to said first user and to display said second tool image only to said second user.

9. An autostereoscopic parallax gaming system of claim 1 wherein:
each of said front and rear liquid crystal displays are illuminated by a single back light; and
said front and rear image planes of said display being asynchronously controllable whereby a first frame rate on said front image plane can be at least twice a second frame rate of said rear image plane.

10. An autostereoscopic parallax gaming system of claim 9 wherein said front and rear image planes can be controlled synchronously whereby the frame rate of said front display is substantially the same as the frame rate of said rear display, and wherein said controller dynamically switches between said synchronous and asynchronous control in response to rapid user movement relative to said display.

11. An autostereoscopic parallax gaming system of claim 1 wherein said at least a first and second users comprise at least a third user.

12. An autostereoscopic parallax gaming system of claim 1, further comprising:
a physical desktop workspace including a housing;
a haptic touch interface; and
a partially transparent mirror,
wherein the display is positioned by said housing with respect to the partially transparent mirror, the display and partially transparent mirror being positioned by the housing to create an augmented reality environment that integrates the user's hands with virtual three-dimensional (3D) models in the physical desktop workspace.

13. An autostereoscopic parallax gaming system of claim 1, wherein said controller provides gaming imagery signals to said display, and wherein each of said users competes in said wagering game.

14. An autostereoscopic parallax gaming system of claim 1, wherein the controller is further configured to maintain an accounting of winnings from said wagering game.

15. An autostereoscopic parallax gaming system of claim 1, wherein said first and second liquid crystal displays are illuminated by one or more back lights.

16. A dynamic parallax barrier autostereoscopic gaming system, comprising:
a display that generates front and rear displays each in a different image plane, said front display providing dynamic barrier strips with transparent regions therebetween, said rear display providing images viewable through said transparent regions, said front display includes a front liquid crystal display plane and said rear display includes a rear liquid crystal display plane, said front liquid crystal display plane providing said dynamic barrier strips with said transparent regions therebetween, said rear liquid crystal display plane providing said images viewable through said transparent regions so as to provide three-dimensional imagery, said front liquid crystal display plane and said rear liquid crystal display plane are in a stacked configuration, said first and second liquid crystal display devices being illuminated by one or more back lights;

a tracking system that tracks the respective position of at least a first user and a second user;

a controller that controls the display for displaying said dynamic barrier strips and said images, wherein each of said first and second users views different imagery, said controller further communicating with said tracking system and configured to dynamically control said display in response to movement of one or more of said first and second users, said controller communicating with said display and being configured to cause said display to simultaneously display different three dimensional imagery to each of said first and second users, said controller being further configured to determine an outcome of a wagering game; and wherein said front and rear planes are configured to be controlled asynchronously whereby a first frame rate on said front plane may be at least twice a second frame rate of said rear plane display.

17. An autostereoscopic parallax gaming system of claim 16, wherein said three-dimensional imagery comprises a virtual slot machine, a card game, a vehicle race, or a sporting event, or any combination thereof.

* * * * *